United States Patent [19]

Kinoshita et al.

[11] Patent Number: 5,317,606
[45] Date of Patent: May 31, 1994

[54] AUTOMATION SYSTEM FOR NUCLEAR POWER PLANTS

[75] Inventors: Mitsuo Kinoshita; Takaharu Fukuzaki, both of Hitachi; Kanji Kato, Katsuta; Akira Nishimura, Hitachi; Yuichi Higashikawa, Hitachi; Yoshiyuki Miyamoto, Hitachi; Yukihisa Fukasawa, Hitachi; Kazuo Asami, Hitachi; Koji Kurokawa, Hitachi; Tatsuo Hayashi, Hitachi, all of Japan

[73] Assignee: Hitachi, Ltd., Tokyo, Japan

[21] Appl. No.: 571,220

[22] Filed: Aug. 23, 1990

[30] Foreign Application Priority Data

Aug. 25, 1989 [JP] Japan ............................. 1-217358

[51] Int. Cl.$^5$ ............................................. G21C 7/36
[52] U.S. Cl. ................................. 376/217; 376/216; 376/241
[58] Field of Search .............. 376/216, 217, 218, 241, 376/242, 249; 364/138, 492, 188, 189, 431, 513, 556, 274.3; 976/DIG. 302, DIG. 208, DIG. 139

[56] References Cited

U.S. PATENT DOCUMENTS

| | | | |
|---|---|---|---|
| 3,932,885 | 1/1976 | Czerniejewski | 444/1 |
| 4,236,220 | 11/1980 | Kogami et al. | 364/504 |
| 4,853,175 | 8/1989 | Book Sr. | 376/216 |
| 4,943,408 | 7/1990 | Yamamoto et al. | 376/210 |
| 4,977,529 | 12/1990 | Gregg et al. | 364/576 |
| 5,009,833 | 4/1991 | Takeuchi et al. | 376/271 |

OTHER PUBLICATIONS

Technical Notes by J. M. Kontoleon Nuclear Science and Engg. 73, (84-107) 1980.

Primary Examiner—Donald P. Walsh
Assistant Examiner—Meena Chelliah
Attorney, Agent, or Firm—Antonelli, Terry Stout & Kraus

[57] ABSTRACT

This invention relates to an automation system for nuclear power plants. This system comprises operation plan making means, supervisory control means, and control means for controlling controlled objects. The operation plan making means makes a new operation plan to restore a normal operating condition which existed before the plant condition deviated from the normal operation range. The supervisory control means outputs control commands according to an operation plan under abnormal condition when the plant operating condition deviates from the normal operation range. Furthermore, the supervisory control means outputs control commands according a new operation plan prepared by the operation plan making means after an operation according to an operation plan under abnormal condition has been finished. The control means for controlling controlled objects controls the controlled objects according to control commands output from the supervisory control means.

8 Claims, 31 Drawing Sheets

FIG. I(A)
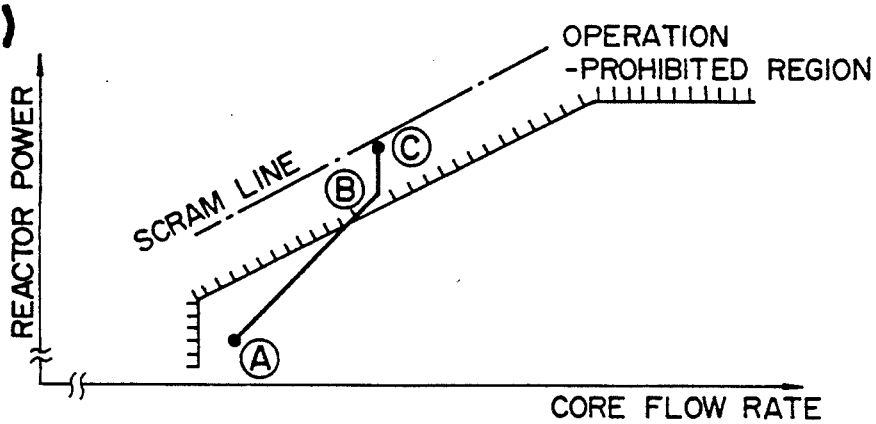
FIG. I(B)
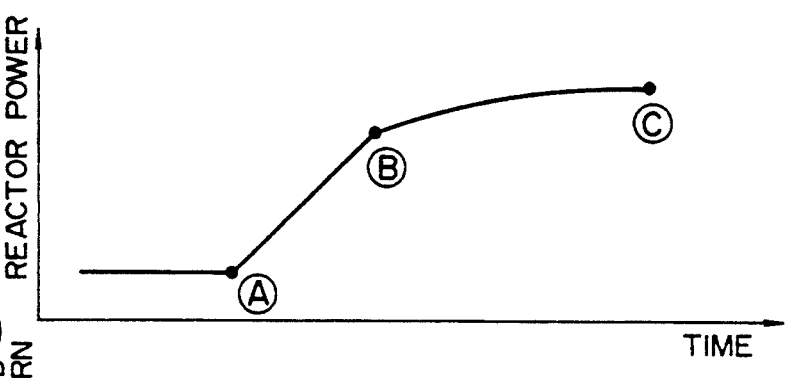
FIG. I(C)
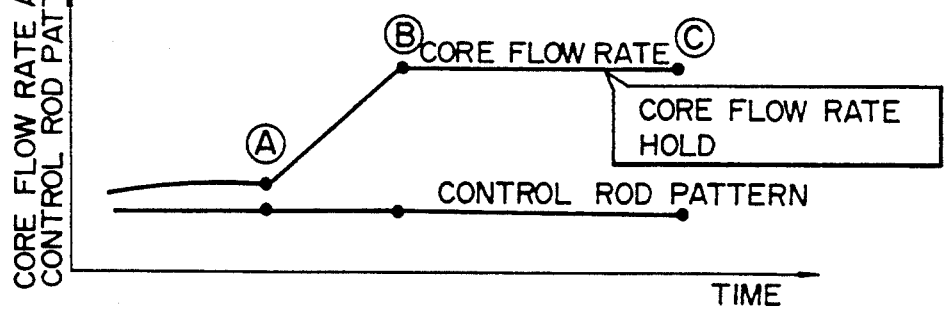
FIG. I(D)
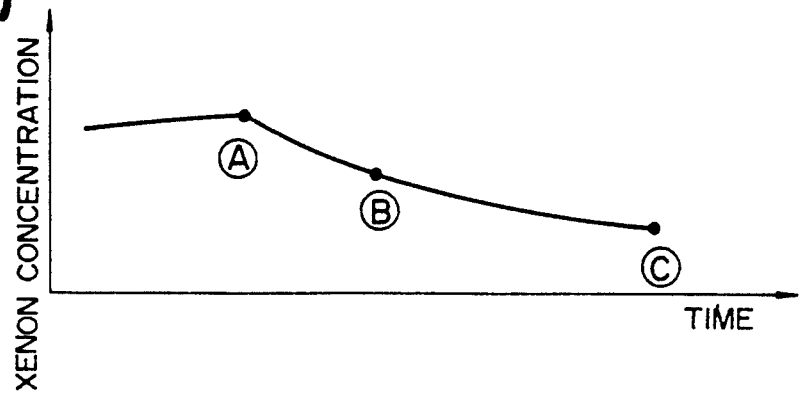

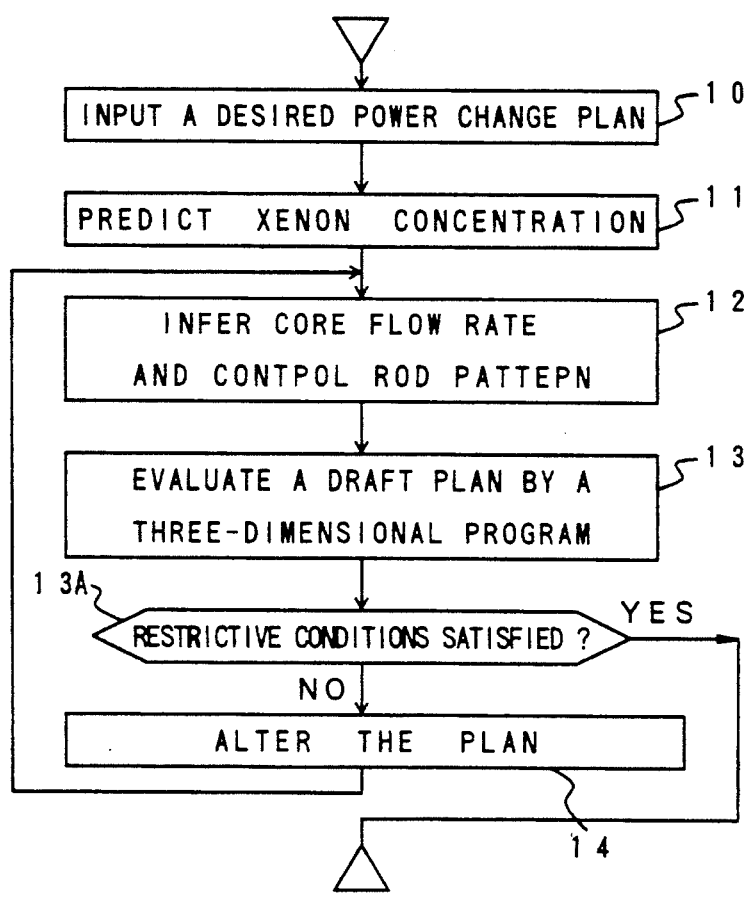

FIG. 6

```
(IF START
  THEN (A GROUP OF RULES {A GROUP OF CONDITION SETTING RULES} ) )

(IF PLAN MAKING
  THEN (A GROUP OF RULES {A GROUP OF PLAN MAKING RULES} ) )

(IF PLAN CHECK
  THEN (A GROUP OF RULES {A GROUP OF PLAN CHECK RULES} ) )

(IF CR SEARCH
  THEN (A GROUP OF RULES {A GROUP OF CR SEARCH RULES} ) )

(IF FLOW SEARCH
  THEN (A GROUP OF RULES {A GROUP OF FLOW SEARCH RULES} ) )

(IF PLAN REVISION
  THEN (A GROUP OF RULES {A GROUP OF PLAN REVISION RULES} ) )
```

FIG. 7

```
{A GROUP OF PLAN MAKING RULES}

(RULE_F_3
   IF  (PLAN @KIND=LOAD FOLLOW-UP PLAN)
       (PLAN @CURRENT POWER<=65.0
             @CURRENT POWER-> ?p
             @PREVIOUS POWER< ?p
             @SUBSEQUENT POWER> ?p)
   THEN (EVENT_RESET(CR SEARCH)))
)

(RULE_S_3
   IF  (PLAN @KIND=RESTART PLAN)
       (PLAN @CURRENT POWER>20.0
             @CURRENT POWER<=65.0)
       (LIMIT@CR UPPER LIMIT->?hc)
       (PLAN @PREVIOUS CR>=?hc)
   THEN (EVENT_RESET(FROW SEARhc))
)

(RULE_S_7
   IF  (PLAN @KIND=RESTART PLAN)
       (PLAN @CURRENT POWER>=90.0)
       (LIMIT@FLOW RATE UPPER LIMIT->?mf
             @CR UPPER LIMIT->?mc)
       (PLAN @PREVIOUS FLOW RATE>=?mf)
             @PREVIOUS CR<=?mc)
   THEN (EVENT_RESET(CR SEARCH)))
)
```

FIG. 8

```
{A GROUP OF SEARCH RULES}

(RULE_CR_1
  IF CR SEARCH [OFF].
  THEN (SEND PLAN CR SEARCH)
       CR SEARCH [ON].
         (DELETE_PRIVATEMEMO (CR SEARCH [OFF]))
)

(RULE_CR_2
  IF CR SEARCH [ON].
       (LIMIT @CR UPPER LIMIT->?hc)
       (PLAN  @CURRENT CR      >?hc)
  THEN (SEND PLAN POWER SEARCH)
       CR SEARCH [OFF].
         (DELETE_PRIVATEMEMO (CR SEARCH [ON]))
         (EVENT_RESET (PLAN MAKING END CHECK))
)

(RULE_CR_3
  IF CR SEARCH [ON].
       (LIMIT @CR UPPER LIMIT->?hc)
       (PLAN  @CURRENT CR      <=?hc)
  THEN CR SEARCH [OFF].
         (DELETE_PRIVATEMEMO (CR SEARCH [ON]))
         (EVENT_RESET (PLAN MAKING END CHECK))
)
```

FIG. 9

```
{CURRENT OPERATION PLAN}

(LIMIT   CLASS                  LIMIT CONDITIONS
         FLOW RATE UPPER LIMIT   1 0 2. 0
         FLOW RATE LOWER LIMIT     8 8. 0
         CR UPPER LIMIT          1 1 0. 0
         DESIRED TIME OF        [        ]---> WHEN REVISING THE
         CR CORRECTION                         PLAN, THE USER SETS
         CR DESIRED VALUE       [        ]     DESIRED VALUES.

(PLAN    CLASS                  PLAN DATA
         KIND                   LOAD FOLLOW-UP PLAN(OR RESTART PLAN)
         PREVIOUS POWER           5 2. 0
         CURRENT POWER            6 3. 6
         SUBSEQUENT POWER         7 5. 3
         PREVIOUS FLOW RATE       6 1. 5
         CURRENT FLOW RATE      [        ]--- INPUT INFERENCE RESULT.
         PREVIOUS CR              9 0. 0
         CURRENT CR             [        ]--- INPUT INFERENCE RESULT.
         PLAN ADEQUACY JUDGEENT [        ]--> AFTER A PLAN HAS BEEN
         PLAN REVISION METHOD   [        ]    MADE, INPUT RESULT OF THE
                                               USER'S JUDGEMENT.
```

FIG. 10

```
{CURRENT OPERATION PLAN}

(DATA_1    CLASS                        DATA
           OPERATING POINT NUMBER          1
           TIME OD DAY                  20h00
           GENERATOR POWER              100.0
           REACTOR POWER                 98.5
           CR PATTERN                   100.0
           CORE FLOW RATE                97.5
)

(DATA_2    CLASS                        DATA
           OPERATING POINT NUMBER          1
           TIME OF DAY                  20h15
           GENERATOR POWER              100.0
           REACTOR POWER                 98.5
           CR PATTERN                   100.0
           CORE FLOW RATE                97.5
)
```

FIG. 14

| OPERATING POINT / ITEM | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| TIME OF DAY | 20:00 | 23:00 | 23:30 | 23:45 | 0:00 | 0:15 | 0:30 | 0:45 | 1:00 | 1:15 | 1:30 | 2:00 | 3:00 | 3:15 | 4:00 | 20:00 |
| GENERATOR POWER (%) | 0.0 | 0.0 | 0.0 | 0.0 | 0.0 | 10.0 | 10.0 | 20.0 | 20.0 | 35.5 | 40.0 | 77.8 | 94.0 | 97.9 | 100.0 | 100.0 |
| REACTOR POWER (%) | 0.0 | 0.0 | 0.0 | 10.1 | 14.8 | 14.8 | 14.8 | 24.1 | 24.1 | 38.5 | 42.7 | 77.8 | 92.9 | 96.5 | 98.5 | 98.5 |
| CONTROL ROD PATTERN (%) | 0.0 | 0.0 | 23.6 | 43.6 | 54.9 | 56.6 | 58.2 | 79.1 | 80.1 | 110.0 | 110.0 | 110.0 | 110.0 | 110.0 | 110.0 | 97.2 |
| CORE FLOW RATE (%) | 20.0 | 20.0 | 30.0 | 42.0 | 42.0 | 42.0 | 42.0 | 42.0 | 42.0 | 42.0 | 49.1 | 104.0 | 104.0 | 104.0 | 94.2 | 96.4 |
| MFLCPR | 0.00 | 0.00 | 0.00 | 0.06 | 0.10 | 0.10 | 0.11 | 0.22 | 0.22 | 0.45 | 0.49 | 0.69 | 0.83 | 0.86 | 0.92 | 0.82 |
| MFLPD | 0.00 | 0.00 | 0.00 | 0.03 | 0.07 | 0.07 | 0.07 | 0.18 | 0.18 | 0.43 | 0.47 | 0.67 | 0.80 | 0.83 | 0.89 | 0.76 |

F I G. 15
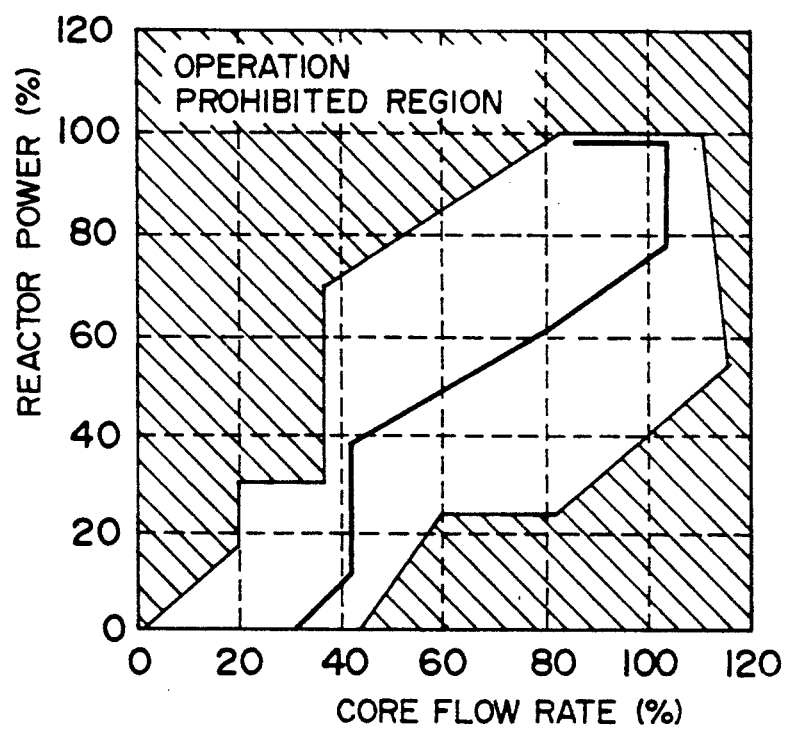

FIG. 19

| No. | OPERATION MODE | OPERATION PLAN UNDER ABNORMAL CONDITION | |
|---|---|---|---|
| | | NAME | DESCRIPTION OF ACTIONS TAKEN FOR ABNORMALITY |
| 1 | REACTOR OUTPUT OPERATION MODE (REACTOR POWER 10% OR MORE) | AUTOMATIC ACTION(1) FOR DISOBEDIENCE TO THE OPERATION RANGES OF POWER AND FLOW RATE | 1. IF THE OPERATING POINT FOR REACTOR POWER AND CORE FLOW RATE REACHES THE APRM ROD BLOCK LINE, THE INCREASE OF REACTOR POWER LIFTING THE CONTROL RODS AND INCREASING THE CORE FLOW RATE IS INTERRUPTED AUTOMATICALLY. <br> 2. IF THE REACTOR POWER EXCEEDS THE ROD BLOCK LINE BY MORE THAN A PREDETERMINED VALUE, THE CORE FLOW RATE IS DECREASED, THUS AUTOMATICALLY REDUCING THE REACTOR POWER 10%. <br> 3. IF THE REACTOR POWER INCREASES FURTHER AND COMES CLOSE TO THE SCRAM LINE, THE CONTROL RODS ARE LOWERED, THUS AUTOMATICALLY REDUCING THE REACTOR POWER 10%. |
| 2 | | AUTOMATIC ACTION(2) TAKEN FOR DISOBEDIENCE TO THE OPERATION RANGE OF POWER AND FLOW RATE | 1. IF THE OPERATING POINT FOR THE REACTOR POWER AND THE CORE FLOW RATE COMES INTO THE UNSTABLE REGION BY LOW FOLW RATE, THE CONTROL RODS ARE LOWERED, THUS AUTOMATICALLY REDUCING THE REACTOR POWER TO 25%. |
| 3 | | AUTOMATIC ACTION TAKEN WHEN THE FEED WATER PUMP TRIPS | 1. IF THE REACTOR IS 50% OR MORE AND ONE OF THE TWO TURBINE-DRIVEN FEED WATER PUMPS TDRFP TRIPS AND A STAND-BY FEED WATER PUMP TDRFP STARTS TO RUN, THE UPPER LIMIT VALUE OF THE REACTOR POWER IS SET TO AT LEAST 75%. (THE REACTOR POWER AUTOMATICALLY DECREASES DUE TO A DECREASE IN THE CORE FLOWRATE.) <br> 2. IF THE REACTOR POWER IS 50% OR MORE AND ONE OF THE TDRFPS TRIPS AND A STAND-BY MDRFP STARTS TO RUN, THE UPPER LIMIT VALUE OF THE REACTOR POWER IS SET TO AT LEAST 50%. (THE REACTOR POWER AUTOMATICALLY DROPS DUE TO A DECREASE IN CORE FLOW RATE AND LOWERING OF THE CONTROL RODS.) |

FIG. 20

| No. | OPERATION MODE | OPERATION PLAN UNDER ABNORMAL CONDITION | |
|---|---|---|---|
| | | NAME | DESCRIPTION OF ACTIONS TAKEN FOR ABNORMALITY |
| 4 | REACTOR OUTPUT OPERATION MODE (REACTOR POWER 10% OR MORE) | AUTOMATIC ACTION WHEN THE CORE THERMAL CHARACTERISTICS ARE ABNORMAL | 1. IF THE ALLOWANCE FOR THE LIMIT VALUES OF THE CORE THERMAL CHARACTERISTICS (MCPR, MLHGR) IS SMALLER THAN A PREDETERMINED VALUE, THE LOWERING OF THE CONTROL RODS AND THE INCREASE IN THE CORE FLOW RATE ARE PROHIBITED, SO THAT THE INCREASE IN THE REACTOR POWER IS INTERRUPTED AUTOMATICALLY.<br>2. IF THE ALLOWANCE FOR THE LIMIT VALUES OF THE CORE THERMAL CHARACTERISTICS BECOMES SMALL, THE CORE FLOW RATE IS REDUCED TO DECREASE THE REACTOR POWER 10%. |
| 5 | | AUTOMATIC ACTION WHEN THE SYSTEM FREQUENCY RISES ABNORMALLY | 1. IF THE SYSTEM FREQUENCY (TURBINE SPEED) BECOMES GREATER BY 0.25 HZ OR MORE THAN A PREDETERMINED VALUE (60 HZ), THE RISE OF THE REACTOR POWER IS INTERRUPTED.<br>2. IF THE SYSTEM FREQUENCY BECOMES GREATER BY 1.0 HZ OR MORE THAN A PREDETERMINED VALUE, THE UPPER LIMIT VALUE OF THE REACTOR POWER IS SET TO 80%. (THE DECREASE IN THE CORE FLOW RATE CAUSES THE REACTOR POWER TO DROP. THUS, A RISE IN PRESSURE AND AN INCREASE IN NEUTRON FLUX DUE TO A DIFFERENCE IN OPERATING CHARACTERISTICS BETWEEN THE STEAM CONTROL VALVE AND THE BYPASS VALVE ARE PREVENTED TO AVOID A SCRAM OF THE REACTOR.)<br>3. IF THE SYSTEM FREQUENCY INCREASES BY 20 HZ OR MORE THAN A PREDETERMINED VALUE, THE UPPER LIMIT VALUE OF THE REACTOR POWER IS SET TO 50%. (THE REACTOR POWER IS DECREASED AUTOMATICALLY BY REDUCING THE CORE FLOW RATE AND BY LOWERING THE CONTROL RODS.) |

FIG. 21

| No. | OPERATION MODE | OPERATION PLAN UNDER ABNORMAL CONDITION | |
|---|---|---|---|
| | | NAME | DESCRIPTION OF ACTIONS TAKEN FOR ABNORMALITY |
| 6 | REACTOR START OPERATION MODE (REACTOR POWER LESS THAN 10%) | AUTOMATIC ACTION WHEN SRNM* IS EXTREMELY ABNORMAL<br><br>(* START REGION NEUTRON MONITOR) | 1. IF THE REACTOR PERIOD IS 20 SEC. OR LESS OR THE NEUTRON FLUX LEVEL BY SRNM IS HIGHER THAN A PREDETERMINED VALUE, LOWERING OF THE CONTROL RODS IS INTERRUPTED.<br>2. IF THE NEUTRON FLUX LEVEL OF SRNM RISES FURTHER, THE CONTROL RODS ARE LOWERED AUTOMATICALLY. |
| 7 | | AUTOMATIC ACTION WHEN THE REACTOR TEMPERATURE RISE RATE IS ABNORMAL | 1. IF THE RISE RATE OF THE REACTOR TEMPERATURE IS 50°C/H OR HIGHER, THE LIFTING OF THE CONTROL RODS IS INTERRUPTED.<br>2. IF THE RISE RATE OF THE REACTOR TEMPERATURE IS 55°C/H OR HIGHER, THE CONTROL RODS ARE LOWERED AUTOMATICALLY. |
| 8 | | AUTOMATIC ACTION WHEN APRM* IN STARTING THE REACTOR IS EXTREMELY ABNORMAL<br><br>(* OUTPUT REGION NEUTRON MONITOR) | 1. IF THE NEUTRON FLUX LEVEL BY APRM IS 11% OR HIGHER, THE INCREASE IN REACTOR POWER BY LIFTING OF THE CONTROL RODS OR BY INCREASING THE CORE FLOW RATE IS INTERRUPTED.<br>2. IF THE NEUTRON FLUX LEVEL BY APRM IS 13% OR HIGHER, THE CONTROL RODS ARE LOWERED AUTOMATICALLY TO REDUCE REACTOR POWER.<br>(THIS ACTION IS TAKEN TO PREVENT A SCRAM OF THE REACTOR WHEN APRM BECOMES 15%.) |

FIG. 22
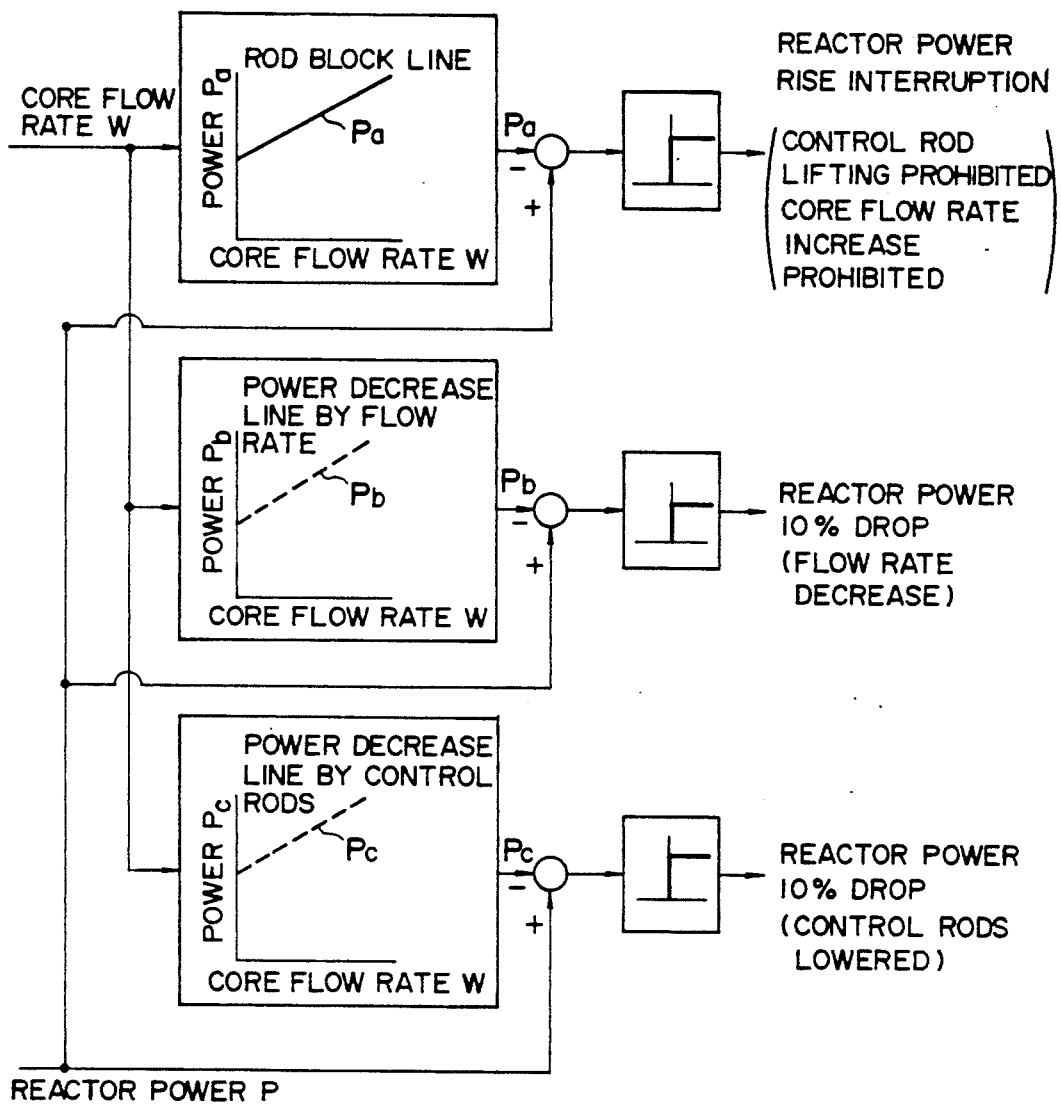
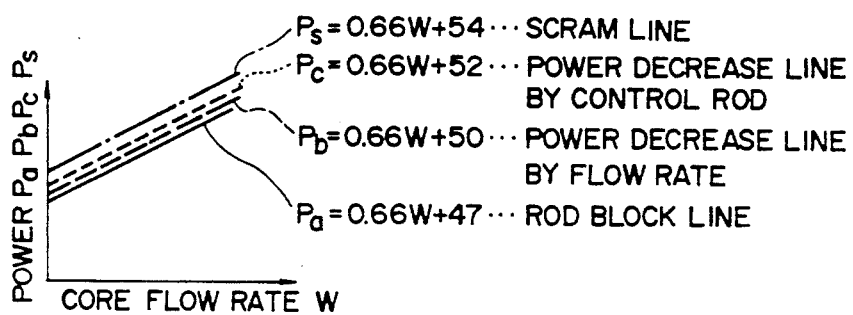

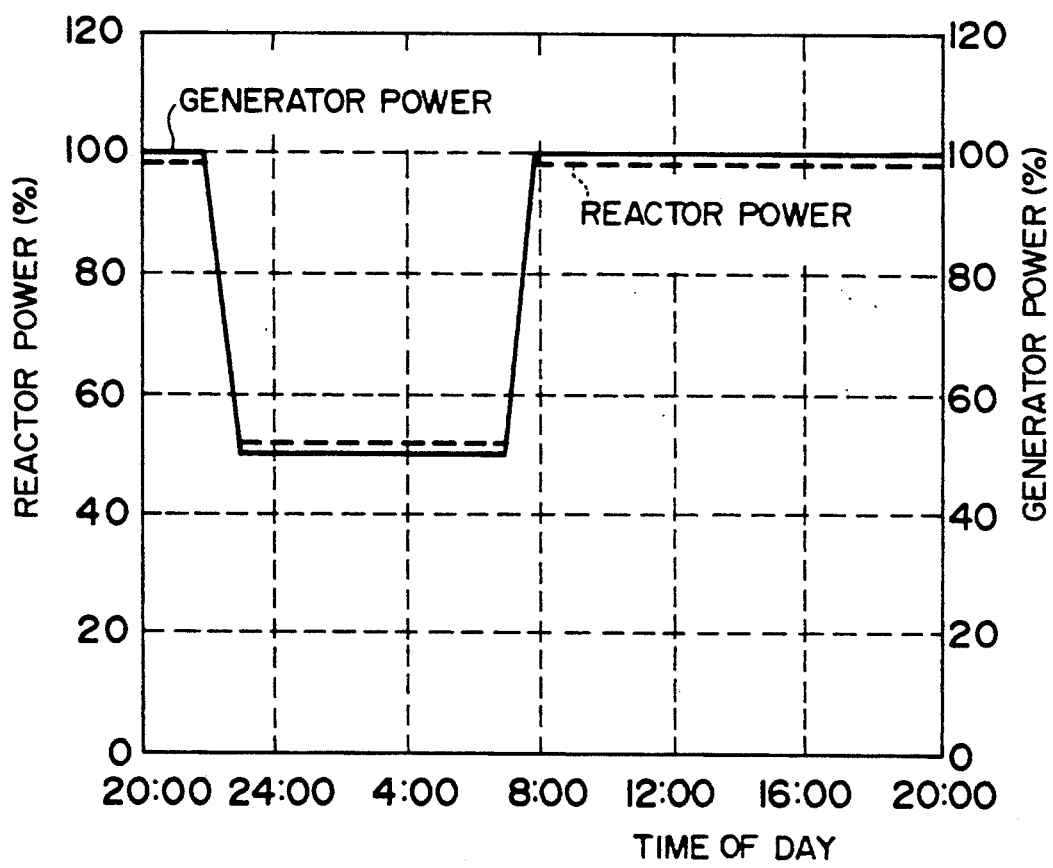
F I G. 28

FIG. 30

| ITEM \ OPERATING POINT | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| TIME OF DAY | 20:00 | 22:00 | 22:45 | 23:00 | 3:00 | 3:15 | 3:30 | 6:45 | 7:00 | 7:15 | 8:00 | 8:15 | 9:15 | 9:30 | 9:45 | 10:30 | 10:45 | 14:00 | 20:00 |
| GENERATOR POWER (%) | 100.0 | 100.0 | 62.5 | 50.0 | 50.0 | 50.0 | 50.0 | 50.0 | 50.0 | 62.5 | 100.0 | 100.0 | 100.0 | 100.0 | 100.0 | 100.0 | 100.0 | 100.0 | 100.0 |
| REACTOR POWER (%) | 98.5 | 98.5 | 63.6 | 52.0 | 52.0 | 52.0 | 52.0 | 52.0 | 52.0 | 63.6 | 98.5 | 98.5 | 98.5 | 98.5 | 98.5 | 98.5 | 98.5 | 98.5 | 98.5 |
| CONTROL ROD PATTERN (%) | 100.0 | 100.0 | 100.0 | 86.7 | 86.7 | 86.7 | 86.7 | 86.7 | 90.0 | 104.5 | 104.5 | 104.5 | 104.5 | 104.5 | 100.0 | 100.0 | 100.0 | 100.0 | 100.0 |
| CORE FLOW RATE (%) | 97.6 | 97.6 | 52.7 | 52.7 | 69.7 | 69.9 | 70.0 | 66.5 | 61.5 | 61.5 | 103.7 | 99.9 | 88.4 | 87.6 | 92.6 | 88.9 | 88.1 | 84.2 | 88.0 |
| MFLCPR | 0.84 | 0.84 | 0.66 | 0.48 | 0.45 | 0.45 | 0.45 | 0.46 | 0.48 | 0.66 | 0.84 | 0.86 | 0.90 | 0.91 | 0.86 | 0.87 | 0.88 | 0.89 | 0.88 |
| MFLPD | 0.78 | 0.78 | 0.61 | 0.42 | 0.39 | 0.39 | 0.39 | 0.40 | 0.43 | 0.62 | 0.79 | 0.81 | 0.85 | 0.86 | 0.80 | 0.81 | 0.81 | 0.83 | 0.81 |

AUTOMATION SYSTEM FOR NUCLEAR POWER PLANTS

BACKGROUND OF THE INVENTION

This invention relates to an automation system for nuclear power plants, and more particularly to an automation system for nuclear power plants, which is suitable for application to boiling water type nuclear power generation plants and which becomes effective when the plant condition deviates from the normal operation range.

Starting of the nuclear power plant or adjusting the control rod pattern have been done according to an operation plan prepared beforehand. If the nuclear power generation plant is in the state as prearranged in the operation plan, there is no problem in operating the plant according to the operation plan. However, when the process quantities such as reactor power, core flow rate, neutron flux, core temperature, core performance which is a thermal characteristic of the reactor core or the operating condition of the equipment such as the pump and control rods differs from the plan, the operators of the plant usually make various decision-making operations.

In the load follow-up operation of the boiling water reactor (BWR), a technique of preventing the core from deviating from the operational limit condition or a technique regarding the remedial actions for the deviation is disclosed in JP-A-57-189097 entitled "Operation Control System of Boiling Water Reactor." This Japanese patent publication describes with regard to the load follow-up operation (1) when a decision is made that data used for calculating the core performance (core flow rate, core pressure, core temperature, neutron flux, etc.) or the calculated values of core performance deviate from the operational limit condition, a method for avoiding the deviation from the operational limit condition is considered (the load follow-up plan is revised) and (2) when the above-mentioned plant data or the calculated values of core performance have deviated from the operational limit condition, the recirculation flow rate control system is blocked, and then, an operation plan to bring the above-mentioned data or the like back within the limit condition or an operation plan after the data has returned within the limit condition is prepared. Blocking the recirculation flow rate control system is meant here to maintain the current condition without changing the recirculation flow rate (more specifically, not to change the set value of the recirculation pump speed or the recirculation flow rate).

SUMMARY OF THE INVENTION

The object of this invention is to provide a nuclear power plant automation system for improving the operating rate of the nuclear power plant, lessening the burden on the operators and engineers in abnormal plant condition, and achieving the reduction of labor requirement.

This invention comprises:
operation plan making means for, after the nuclear power plant has been operated according to an operation plan under abnormal condition, making an operation plan to return to the normal operating condition, which had existed before the plant condition deviated from the normal operation range, from the condition that the operation according to the operation plan under abnormal condition has been finished;

means for storing the operation plan under abnormal condition to decrease the reactor power to a power level within the normal operation range when the operating condition of the nuclear power plant deviates from the normal operation range;

means for deciding from detected plant data whether or not to perform an operation according to the operation plan under abnormal condition;

control and arithmetic means for outputting control commands according to the operation plan;

means for transmitting the operation plan under abnormal condition to the control and arithmetic means when the decision means makes a decision to perform an operation according to the operation plan under abnormal condition;

supervisory control means having the control and arithmetic means for outputting control commands according to the new operation plan mentioned above when the operation plan under abnormal condition has been executed; and control means for controlling automatically controlled object according to the control commands.

To be more specific, in a start operation, stop operation, load follow-up operation, rated-power operation or control rod pattern adjusting operation, the supervisory control means has stored therein a plurality of operation plans under abnormal condition to decrease the reactor power to a power level within the normal operation range when the operating condition of the nuclear power plant deviates from the normal operation range, decides from detected plant data whether or not to apply the above-mentioned operation plan under abnormal condition, and when it has made a decision to perform an operation according to the operation plan under abnormal condition, controls the reactor operation to interrupt the increase in the reactor power or decrease the reactor power by the recirculation flow rate control means and/or control rod operation control means. An operation plan after the operation according to the above-mentioned operation plan under abnormal condition is prepared by an operation plan unit.

Preferably, the operation plan under abnormal condition has a plurality of remedial actions to use according to the degree of deviation of the plant condition from the normal operation range, and includes an operation plan to interrupt the increase in the reactor power when the degree of the deviation of the plant condition from the normal operation range is small, and decreases the reactor power to automatically bring the reactor power back within the normal operation range when the above-mentioned degree becomes large.

The operation plan under abnormal condition includes an automatic action for a violation of the operation range related to the reactor power and the core flow rate, an automatic action for abnormality in the reactor feed water system, an automatic action for abnormality in the thermal characteristic of the core, an automatic action for abnormality frequency increase of the power system, an automatic action for abnormal drop in the vacuum of the condenser, an automatic action for abnormality in the neutron flux, and an automatic action for abnormal change rate of the reactor temperature. Each of those automatic actions includes an action to interrupt the increase in the reactor power and/or an action to automatically decrease the reactor power by a predetermined value or to a predetermined level.

In order to shorten the time for decision as to whether or not to apply an operation plan under abnormal operation, it is desirable to limit kinds of decision about application of an operation plan under abnormal condition according to the reactor conditions (operation modes, for example).

Since the probability of operating the reactor according to an operation plan under abnormal condition is low, it is uneconomical to install one operation plan making means for each power generation plant. Therefore, an operation plan making means may be installed for a plurality of plants. This operation plan making means is capable of making operation plans of a plurality of plants as occasion demands.

The operation plan making means should preferably receive a desired value of the reactor power or the generator power from the engineers, infers, by using knowledge engineering methods, manipulated variables (e.g., a core flow rate value, control rod pattern) for achieving a desirable reactor power or generator power according to knowledge about operation plan formulation, stored beforehand, evaluates the adequacy of an operation plan resulting from the inference by a simulator which simulates the reactor characteristics, and shows the evaluation result on the display unit.

Incidentally, when making an operation plan, if one wishes to quantitatively decide values of the flow rate, for example, only by knowledge (rules), a huge number of items of knowledge will be required. In order to avoid this, the manipulated variables of the plant operation is inferred from knowledge about the formulation of operation plans and a simple simulator for simulating the outline of the reactor characteristics. Then, the adequacy of the operation plan is evaluated by a simulator (three-dimentional simulator, for example) capable of more detailed simulation of the reactor characteristics that the simple simulator mentioned above.

Therefore, the aspects of this invention which differ greatly from the conventional technique are that when the plant condition deviates from the normal operation range, the plant condition are made to automatically return within the normal operation range by decreasing the reactor power by a predetermined range or to a predetermined level, that there are a plurality of remedial actions to apply according to the degree of deviation from the normal operation range, that not only the recirculation flow rate but also the control rods are operated automatically, and that an operation plan after an automatic action under abnormal condition is taken is an operation plan which starts within the normal operation range and does not include an operation plan to bring the plant out of the condition of disobeying some operational limit condition back within the limit condition. The conventional technique does not reveal how an operation plan is made, but in an embodiment of this invention, an operation plan is made by using methods of knowledge engineering and a simulator for simulating the reactor characteristics, which is operated when necessary.

The supervisory control means has stored therein a normal operation plan corresponding to any one of the plant start operation, stop operation, load follow-up operation, rated power operation, control rod pattern adjusting operation. Therefore, the plant is operated according to this operation plan. The supervisory control means has stored therein a plurality of operation plans under abnormal condition, related to automatic actions under abnormal plant condition, to prevent a reactor scram by decreasing the reactor power to automatically return to the normal operation range when the plant condition deviates from the normal operation range, and decides whether or not to apply an operation plan under abnormal condition mentioned above according to data obtained by measurement of the plant. If the supervisory control means decides that an operation should be performed according to an operation under abnormal condition, the plant is controlled by switching from a normal operation plan to an operation plan under abnormal condition (for example, by switching a normal set value of the recirculation pump speed to a set value under abnormal plant condition). As a result, the plant condition automatically settles down to a desirable condition (i.e., within the normal operation range) that the reactor power is at a low level. When an operation was done according to an operation plan under abnormal condition mentioned above, the plant condition differs from that under normal plan, the operation plan making means prepares an operation plan to return to the operating condition in which it was (100% of the rated value of the reactor power). Consequently, an operation plan is produced to, for example, gradually increase the reactor power from a normal operation range to the rated value and keep the reactor power at this level. Then, to return to the previous normal operating condition (before the deviation from the normal operation range) after the plant was operated according to the operation plan under abnormal condition, the plant is controlled by switching from the operation plan under abnormal condition to the above-mentioned operation plan prepared by the operation plan making means (e.g., the pump speed is switched from a set value under abnormal condition to a set value under normal condition).

Therefore, if the plant condition deviates from the normal operation range, the plant operating condition automatically and temporarily moves into a desirable condition (normal operation range) that sufficiently satisfies the operation standard by decreasing the reactor power, for example, and an operation plan for a subsequent rise in the reactor power can be prepared easily and efficiently, so that the operation can be resumed with ease. As a result, it is possible to improve the operating rate and the operation reliability by avoiding a scram of the reactor, and mitigate the burden on the operators and engineers and reduce the operational labor requirement by use of automatic actions which are taken when abnormality occurs in the plant and also by support of operation plans which are made by an operation plan unit.

In other words, various abnormal conditions of the plant are dealt with automatically and the plant temporarily and automatically moves into a normal operation range, thus preventing a scram of the plant from occurring. In this respect, the operating rate and the operation reliability can be improved. In addition, after the plant is operated according to a plan under abnormal condition, an operation plan can be prepared efficiently which restores a desirable operating condition, so that the operating rate can be improved, the burden on the operators can be reduced and a reduction in labor can be achieved.

BRIEF DESCRIPTION OF THE DRAWINGS

FIGS. 1 (A) to 1 (D) and FIGS. 2 (A) to 2 (C) are characteristic diagrams showing the operating condition of a conventional BWR plant;

FIG. 5 is a diagram for explaining the procedure which is executed in the operation plan unit of FIG. 3;

FIG. 6 is a diagram for explaining metarules stored in the operation plan unit of FIG. 3;

FIG. 7 is a diagram for explaining plan making rules;

FIG. 8 is a diagram for explaining control rod search rules;

FIGS. 9 and 10 are explanatory diagrams of concrete examples of frames;

FIG. 14 is a table for explaining an operation table in relation to the operation plan of FIG. 12;

FIG. 15 is a diagram for explaining an operation route in the operation plan of FIG. 12 by a relation between the reactor power and the core flow rate;

FIGS. 19 to 21 represent a table showing a concrete example

FIG. 22 is a diagram for explaining the logic of the operation mode No. 1 of FIG. 19;

FIGS. 25 to 31 are diagrams for explaining another operation plan prepared in the embodiment of FIG. 3.

DESCRIPTION OF THE PREFERRED EMBODIMENTS

This invention was made as a result of detailed investigation of JP-A-57-18097. In this consideration, the present inventors found that this prior art involves three problems. A first problem is that in the prior art, when the BWR plant condition deviates from the operational limit condition, only action that is taken is to block the recirculation flow rate control system as a means for adjusting the reactor power, and therefore, the condition of deviation from the operational limit condition continues for a relatively long time (time until an operation plan is made to return to within the operational limit condition and an operation is performed according to this plan). A second problem is that when the plant condition deviates from the operational limit condition, it is necessary to minimize the time for making an operation plan to return to within the above-mentioned limit condition, and this necessity increases the burden of the people who devise a plan. A third problem is that when the operational limit condition is exceeded, only blocking the recirculation flow rate control system does not rule out a possibility that the reactor characteristics shift naturally to undesirable state, resulting in a scram of the reactor (automatic stop of the reactor by lowering of all control rods).

These problems with the BWR plant will be described with reference to FIGS. 1 and 2.

FIG. 1 is the result of analysis of the operation of the BWR plant, in which while the reactor power rose from the condition (A) by an increase in the core flow rate (substantially proportional to the recirculation flow rate), the reactor power, for some reason, deviated from the normal operation range and assumed the condition (B) in the operation-prohibited range, and the recirculation flow rate control system is blocked (the increase in the core flow rate is interrupted and the flow rate is held). Even though the core flow rate was held constant under the reactor power condition (B), when the concentration of xenon, a fission product, for example, lowers, the reactor power went up. Therefore, the reactor power rose naturally from the condition (B) to the condition (C), leaving a possibility of occurrence of a scram of the reactor.

Figure 2A:
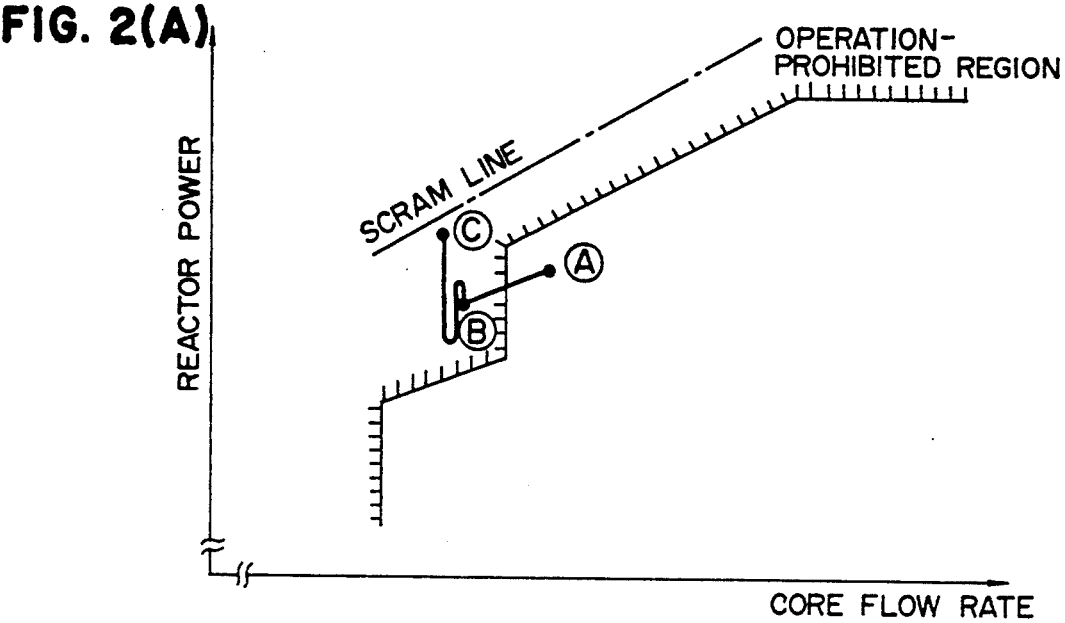
Figure 2B:
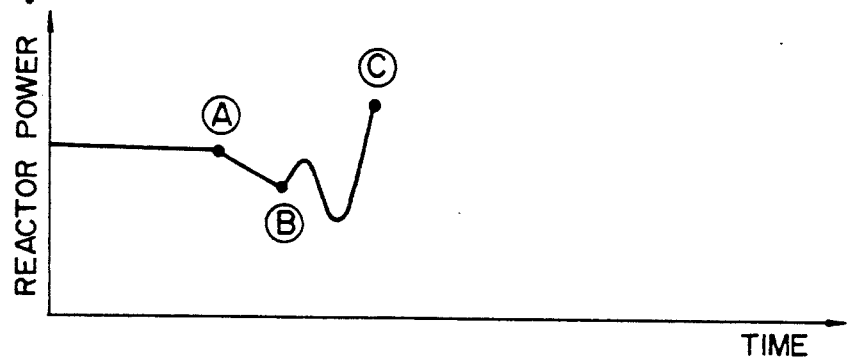
Figure 2C:
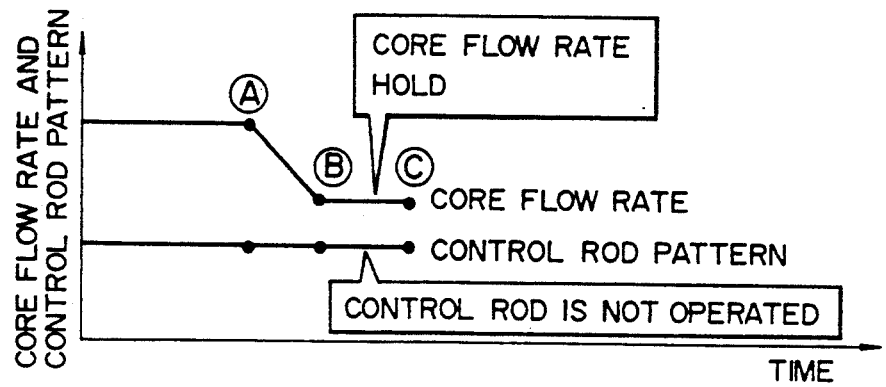

FIG. 2 shows the results of analysis of the operation of the BWR plant, in which owing to the decrease of the core flow rate caused by stoppage of some of the recirculation pumps, the conditions A shifted to the condition (B) of the reactor power unstable region in the operation-prohibited region. In this unstable region, due to the low core flow rate with respect to the reactor power, the reactor power sometimes changes even if the core flow rate does not change. In consequence, there is a possibility that the condition (B) shifts to the condition (C), resulting in a scram of the reactor.

Figure 3:
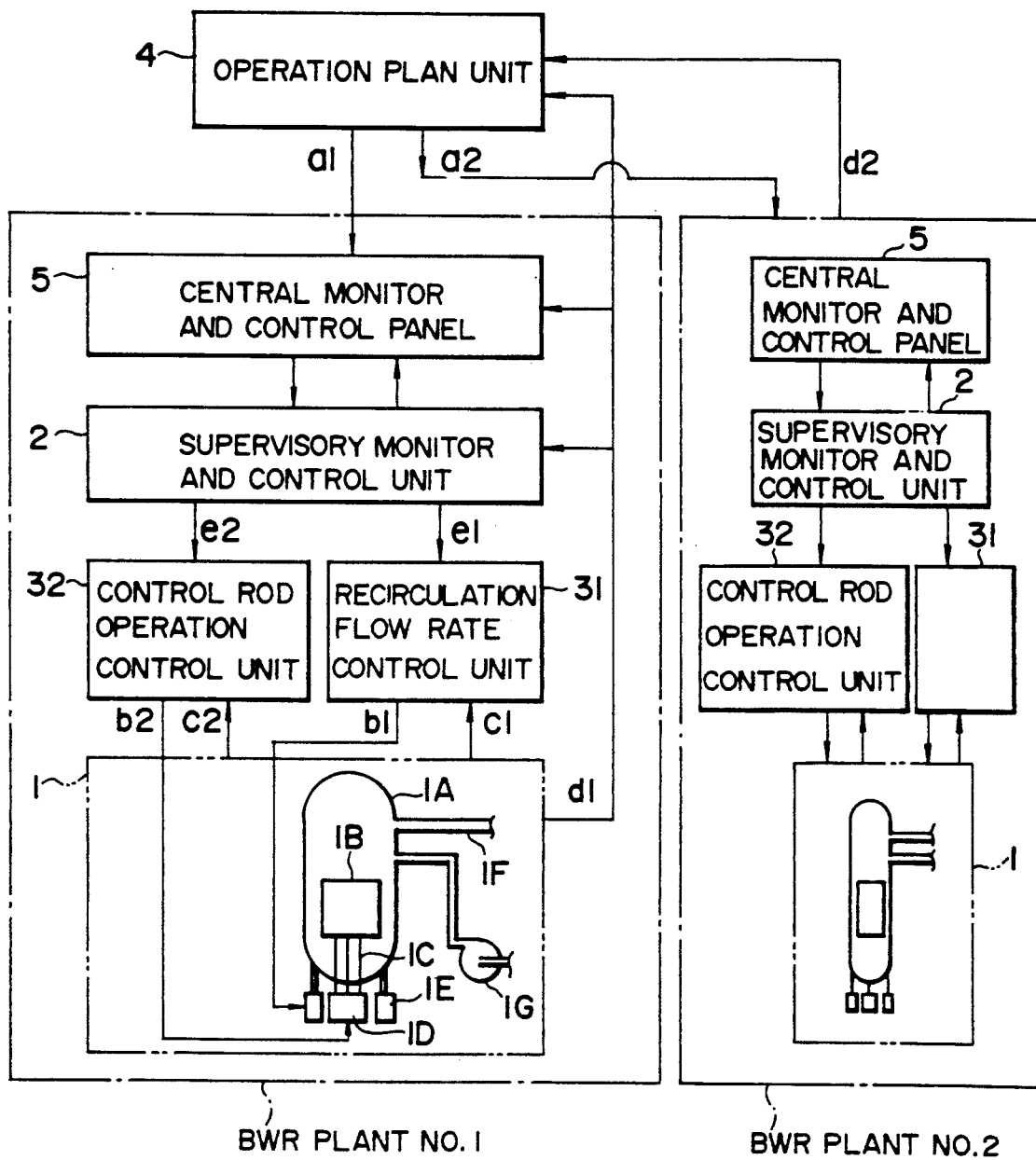
FIG. 3 is a block diagram of a nuclear power plant automation system according to a preferred embodiment of this invention, which is applied to BWR plants.
Figure 4:
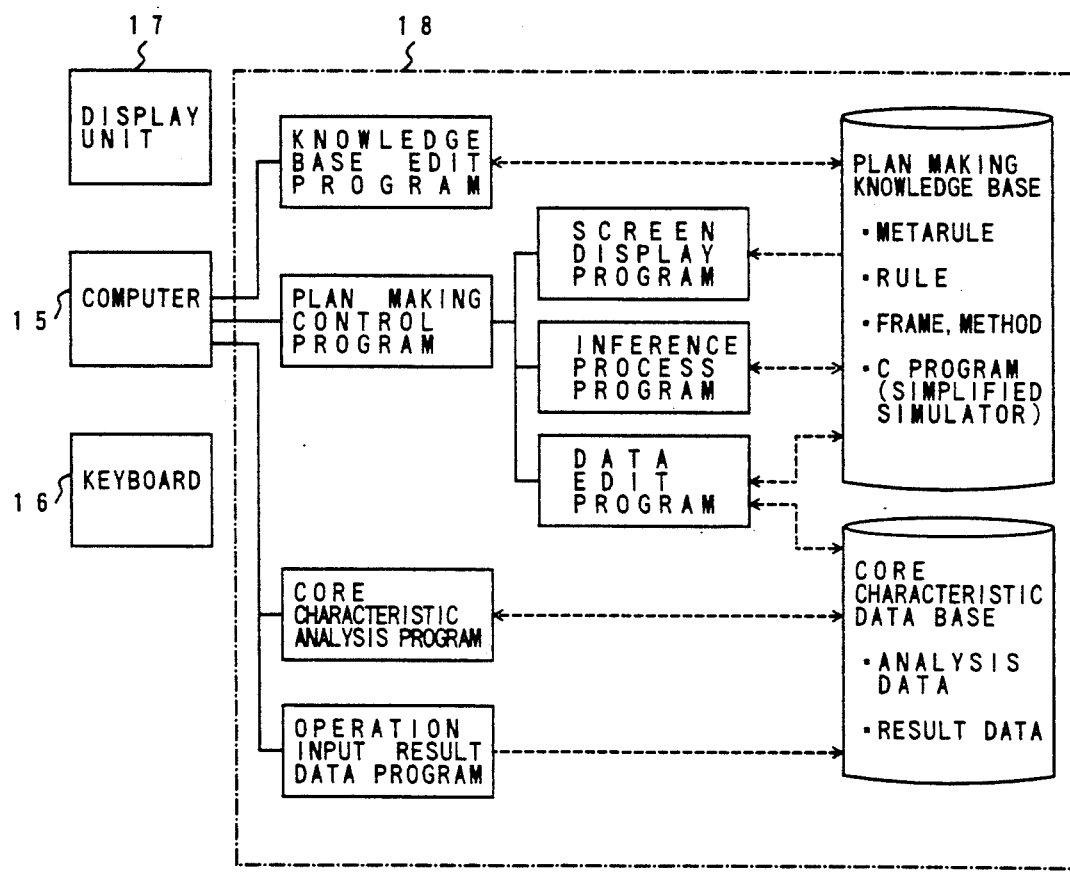
FIG. 4 is a block diagram of the operation plan unit of FIG. 3.

The present inventors studied various schemes to solve the problem mentioned above. As the result of this study, this invention was made. The automation system of a nuclear power generation plant according to an embodiment of this invention will be described with reference to the accompanying drawings. FIGS. 3 and 4 show the composition of this embodiment. This nuclear power plant automation system comprises BWR plants 1, supervisory monitor and control units 2, recirculation flow rate control units 31, control rod operation control units 32 for automatic operation of the control rods, and an operation plan unit for assisting in the formulation of operation plans. This operation plan unit 4 provides assistance, when necessary, in the formulation of operation plans not only for one BWR plant but also for a plurality of BWR plants, such as BWR plant No. 1 and No. 2 in this embodiment, for instance. A BWR plant comprises a reactor pressure vessel 1A, a core 1B contained in the reactor pressure vessel 1A, control rods 1C inserted into the core 1B, a control rod driving unit 1D to operate the control rods 1C, and recirculation pumps 1E to supply cooling water to the core 1B. Reference numeral 1F denotes a main steam pipe, and 1G denotes a feed water pump.

The operation plan unit 4 has a function to assist in the formulation of operation plans to be used after an operation was performed according to an operation plan under abnormal condition as well as in the formulation of operation plans under normal plant condition (for BWR plant start operation, stop operation, load follow-up operation, rated power operation, control rod pattern adjusting operation, etc.) For example, the plant engineers prepare operation plans by using this unit 4.

The central monitor and control panel 5 is used by the operators to monitor and control the plants. To be more specific, using this central monitor and control panel 5, the operators monitor and control the plants to perform an operation according to an operation plan a1 formulated by the operation plan unit 4.

As the control units in this embodiment, there are provided feed water flow rate control units and turbine control units, both not shown, in addition to the recirculation flow rate control units 31 and the control rod operation control units 32. The recirculation flow rate control unit 31 receives input plant data c1 obtained by measurement, such as the recirculation pump speed, neutron flux, and core flow rate and outputs a control signal b1 to control the number of revolutions of the recirculation pumps 1E. The control rod operation control unit 32 receives measured plant data c2 such as the neutron flux, control rod position, and so on and outputs a control signal b2 to the control rod driving unit 1D to operate the control rods.

The supervisory monitor and control unit 2 outputs a target value e1 of recirculation pump speed (or flow rate) to the recirculation flow rate control unit 31 and an operation command e2 for lifting/lowering of control rods to the control rod operation unit 32 to make plant data d1 including reactor power and generator power coincide with the power specified in the operation plan in order to achieve an operation of the BWR plant according to an operation plan a1 (a2 for No. 2 BWR plant). This supervisory monitor and control unit 2 includes a function to prevent a scram of the reactor by automatically applying an operation plan under abnormal condition when the plant condition deviates from a normal operation range in addition to control functions to achieve an operation according to the operation plan a1.

Specifically, the supervisory monitor and control unit 2 stores a plurality of operation plans under abnormal condition, which are executed when any of plant data a1 obtained by measurement at the BWR plant No. 1 (process quantities such as generator power, reactor power, neutron flux, flow rate, temperature, and temperature change rate, and data on the condition of equipment, such as the pumps, valves, and control rods) deviates from the normal operation range. Those operation plans under abnormal condition are related to automatic actions which are taken under abnormal plant condition such as to decrease the reactor power by a predetermined range or to a predetermined level by a decrease of the core flow rate (substantially equal to the recirculation flow rate) and/or by lowering of the control rods. The supervisory monitor and control unit 2 decides whether or not to apply an operation plan under abnormal condition according to plant data d1. When a decision is made that an operation plan under abnormal condition should be applied, the supervisory monitor and control unit 2 switches from the normal operation plan a1 to an operation plan under abnormal condition corresponding to the current condition, and outputs commands e1 and e2 to put this operation plan under abnormal condition into operation.

The recirculation flow rate control unit 31, in response to a command 1, reduces the rotating speed of the recirculation pumps 1E and decreases the core flow rate. The control rod operation control unit 32 controls the lowering of the control rods 1C into the core 1B according to a command e2.

In the manner described, automatic actions are taken under abnormal plant condition such as reducing the reactor power.

After the operation was done according to the plan under abnormal condition, the engineers prepare an operation plan to increase the reactor power to return to a pre-existent power level. The prepared operation plan a1 is input into the supervisory monitor and control unit 2. The operator decides when to start a BWR plant operation according to the newly prepared operation plan. A command to start an operation is transmitted by the central monitor and control unit 2 to the supervisory monitor and control unit 2. The supervisory monitor and control unit 2 controls the BWR plant No. 1 by switching from the operation plan under abnormal condition to the new plan made by the operation plan unit 4.

In the BWR plant No. 2, the central monitor and control panel, supervisory monitor and control unit, recirculation flow rate control unit and control rod operation control unit have substantially the same functions as those of plant No. 1.

Description will now be made in greater detail of the operation plan unit 4, the supervisory monitor and control unit 2, and the control units 31, 32.

(1) Operation plan unit

In this section, description will be made of examples of a plan making procedure, computer software and operation plan. As shown in FIG. 4, the operation plan unit 4 includes a computer 15, a keyboard as an input means, a display unit 17, and a storage device 18.

(i) Procedure of making an operation plan

The operation plan unit 4 stores in the storage device 18 a basic procedure (plan formulation control program) for making or revising a plan for reactor power change by control rod operation and adjustment of the recirculation flow rate 8 or the core flow rate). As shown in FIG. 5, this procedure includes steps 10 to 14. An operation plan prepared by the operation plan unit 4 is registered as a standard operation plan, when necessary, in the plan making knowledge base of the operation plan unit 4. The operation plan unit 4 partially modifies this standard operation plan and makes a new operation plan which is carried out after an operation plan under abnormal condition is serves the purpose. How to make a new operation plan which is executed after an operation plan under abnormal condition has been executed will be described in the following.

(a) The standard operation plans registered in the storage device 18 are shown on the display unit 17. The engineer specifies a standard operation plan similar to a target operation plan (a load follow-up operation plan, for example). The specified standard operation plan is read from the storage device 18. Let us suppose a case in which the generator power is changed in the standard operation plan. The engineer inputs a desired change pattern of generator power that he specified by an input device (Step 10).

(b) Then, a reactor power with thermal efficiency taken into consideration is calculated, the dynamic characteristic of xenon concentration is predicted (Step 11), and a draft of a new operation plan is prepared which is related to the adjustment methods of the core flow rate and the control rod pattern (Step 12). The prediction of the dynamic characteristic of the xenon concentration at Step 11 is done by a core one-point-approximated simulator stored in the plan making knowledge base to be described later.

(c) In order to evaluate the core characteristics in an operation of the BWR plant according to a draft of a newly-prepared operation plan (changes with time of power, flow rate, control rod pattern, core thermal characteristic), the core characteristics are predicted by a core three-dimensional simulator (a core characteristics analysis program to be described later) (Step 13).

(d) The three-dimensional characteristics of the core, obtained by analysis, are shown on the display unit 17. The displayed reactor power, core flow rate, control rod pattern, and the core thermal characteristics are evaluated. If the evaluation result shows that the limit condition is satisfied, the engineer inputs "YES", and if not, he inputs "NO" from the keyboard 16. If a prepared operation plan is unsatisfactory (i.e., "NO" is input), the decision made at Step 13A is "NO", and the process proceeds to Step 14. Whereupon, data required for revision of the operation plan is input from the keyboard 16, and the Steps from Step 12 on are executed. If the decision at Step 13A is "YES" (i.e., the draft operation plan is judged satisfactory), the operation plan making process is finished.

If necessity arises to revise the operation plan during an operation for changing the reactor power, it is possible to revise the operation plan by omitting some of the processes mentioned above.

(ii) Basic composition of the system

As mentioned earlier, the hardware of the operation plan unit 4 comprises a computer 15 for inference for plan making and for analysis of the core characteristics, a display unit 17, which is a graphic display unit, a keyboard 16 for entering data, and an interface for connection with other devices, such as a mouse, a printer and a plotter.

An example of software of the operation plan unit 4 is shown in FIG. 4. This unit 4 assists the operator in preparing and revising operation plans by using knowledge engineering methods and a simulator for simulation of reactor characteristics.

The software comprises a plan making knowledge base, a plan making control program, an inference process program, a screen display program, and a core characteristics analysis program. The outline of software will be described as follows. The inference process program, knowledge data editing program and knowledge base framing, which are supported by a knowledge process system construction support tool, are used.

① Plan making knowledge base

The plan making knowledge base stores data and C-programs used with the inference process program, such as the plan making procedure, limit condition, standard operation plan, prepared operation plans, and a simple simulator for evaluation of core characteristics (core one-point-approximated simulator), prepared by using metarules, rules, frames, methods and C-language programs.

(a) Metarule

The plan making procedure is expressed using a pattern of "if . . . then . . . ", and thereby groups of rules to be used are decided. FIG. 6 shows an example of a metarule. In an actual process, rules are used which correspond to the events in the conditional sections of this metarule. The events such as "plan making" and "plan check" are registered from the rules. If events are not registered in the view note in the beginning of inference, a metarule whose if section has an event "start" is applied. Those metarules are used in the inference at Step 12 of FIG. 5.

(b) Rule

Knowledge by which to decide the timing of core flow rate adjustment and control rod operation and knowledge by which to modify the plan making condition by interactive processing is expressed by rules each composed of a pattern of "if . . . then. The rules are stored divided into a plurality of groups of rules. The "if" section of those rules is a conditional section, while the "then" section is a conclusion section. Of those groups of rules, a group of rules decided by a metarule at Step 12 of FIG. 5 are used. By using those rules, a decision is made whether the reactor power is changed by core flow rate adjustment or by control rod operation, whether or not the reactor power is kept constant by doing both core flow rate adjustment and control rod operation simultaneously, whether or not an achievable reactor power is obtained when the core flow rate and the control rod pattern disobey the limit condition, among other decisions, at specified times of the day (Step 12).

FIG. 7 shows rules of groups of plan making rules. The first rule, "rule_f_3" means that if "the kind of plan is a load follow-up plan and the reactor power (current power) is 65% or less at the time when a plan is made, and is in the course of rising (the current power is greater than the power at the previous specified time (previous power) and smaller than the power at the next specified time (subsequent power)", then, "an event that a control rod (CR) pattern is searched (CR search) is issued."

FIG. 8 shows rules of a group of CR search rules. The rule_cr_1 means that if "a memo of CR search [off] (a flag indicating that the calculation of CR search has not been started) has been registered in the private memo", then, "a method (procedure oriented process) of CR search of a frame of plan is started, a memo of CR search [on] is registered, and a memo of CR search [off] is erased." The rule_cr_2 means that if "a memo of CR search has been registered and the control rod pattern at the current time is greater than the upper limit value", then, "an achievable power is searched (POWER search)." The rules of a group of plan check rules are used to check if all operation plans have been checked at a certain point in time.

(c) Frame

Data including the plan making conditions, standard operation plans, newly-prepared operation plans and data of the core characteristics data base are stored in the form of frame. The procedure oriented processes peculiar to the respective frames are expressed by programs in C language called methods.

FIG. 9 shows an example of frame. The upper frame includes data related to the operation plan making conditions, wherein the upper limit of the core flow rate is 102% and the lower limit is 88%. The lower frame indicates data used in making operation plans, which includes the reactor power, core flow rate, control rod pattern, and data obtained by inference. In FIG. 9, the "flow rate" is "core flow rate", "CR" is "axial direction of control rods", and "power" is "reactor power." This frame stores data entered at Step 10 (e.g., a type of specified standard operation plan (e.g., a load follow-up plan) and data on reactor power according to a power-changed plan. FIG. 10 shows a frame which includes the results of planning such as the reactor power, core flow rate, control rod pattern at specified times.

(d) Program

This program executes general-purpose procedure-oriented processes such as a simulator for evaluation of core characteristics. The simulator for evaluation of the core characteristics is a core one-point-approximated simulator, which is a simplified simulator. Draft operation plans related to the reactor power, core flow rate, and control rod pattern are prepared by use of the core one-point-approximated simulator. The reason for using the above-mentioned simplified simulator is to avoid a problem that necessary rules amount to a very large number, if one tries to find values which are obtained quantitatively such as the core flow rate, control rod pattern and xenon concentration. When a core one-point-approximated simulator is used to determine the values of the reactor power P, the core flow rate F and the control rod pattern CR, the values of two variables are set and the remaining variables are determined. For example, an operation in which values of the reactor power P and the core flow rate F are set and the control rod pattern CR is found is referred to as a CR search. The values of MFLCPR as a core thermal characteristic (=limit value of minimum critical power rate MCPR/MCPR) and MFLPD (=maximum linear heat generation rating MLHGR/limit value of MLHGR) cannot be obtained with high accuracy unless they are calculated by the core three-dimensional characteristics analysis simulator (e.g., a core characteristics analysis program, for example). However, since these data are required as reference data when an approximation operation plan is made by using a core one-point-approximated simulator, a simplified formula obtained by statistical processing of data analyzed in advance is used.

② Plan making control program

This program controls the start and stop of the inference process and what screen images to show on the CRT, and has a procedure of FIG. 5. The plan making control program controls an inference process program, a screen display program, etc. by executing the procedure of FIG. 5.

③ Screen display program

This program shows a prepared operation plan on the CRT and permits processing by interaction with the user.

④ Inference process program

This program is provided by a knowledge process tool, and enables inference of the control rod pattern and the values of the core flow rate by using knowledge (rules) stored in the knowledge base. This inference process program is used particularly at Step 12 of the plan making control program.

⑤ Knowledge base editing program

This program is provided by the knowledge process tool, and is used to edit, debug and compile the knowledge base.

⑥ Core characteristics analysis program

This program analyzes the core three-dimensional characteristics, and outputs power distribution and core thermal characteristics. This core characteristics analysis program is used at Step 13 of FIG. 5.

⑦ Data editing program

This program edits input data for analysis of core characteristics, and also edits results of analysis for display on the CRT.

⑧ Operation data input program

This program inputs operation data of the BWR plant (plant data d1). Data is used to make and revise the operation plans.

⑨ Core characteristics data base

This data base stores core characteristics analysis result obtained by the core characteristics program and operation data.

(iii) Concrete examples of inference at Step 12

Figure 11:
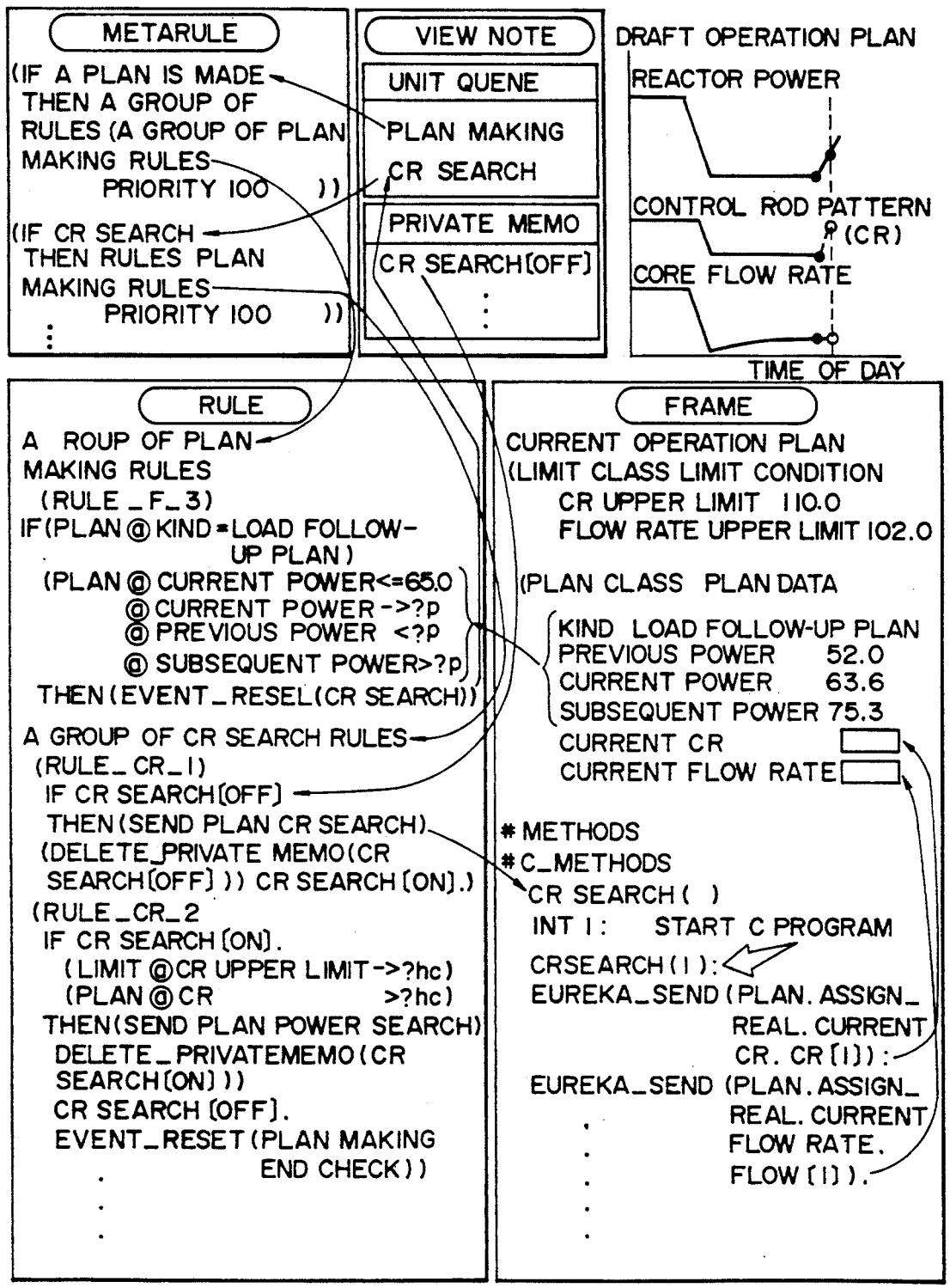
FIG. 11 is a diagram for explaining a concrete process content of step 12 of FIG. 5.

Referring to FIG. 11, description will now be made of an example of operation plan made by inference by using knowledge mentioned above. In this example, as shown at the upper right end (draft operation plan) of FIG. 11, a decision is made that the reactor power rises caused by lifting the control rods at time i when raising the reactor power by a load follow-up operation, and a control rod pattern (current CR value) is found (a pattern of control rods CR is searched). At Step 12, an inference process program is executed. The inference procedure of this program is as shown below.

① Since an event "plan making" has been registered in the unit queue of the view note of the operation plan unit 4, a metarule having "plan making" at its "if" section is searched. As a result of this, a decision is made to apply a group of plan making rules. When inference is made at Step 12, if no event has been registered at the unit queue of the view note, rules of a group of condition setting rules specified in the "then" section of a metarule having "start" in its "if" section is applied. Of those rules, an event (e.g., plan making) set in the conditional section of a rule having, in its "if" section, information (e.g., revision of a standard operation plan) based on data input at Step 10 is registered in the view note.

② The rule-f-3 of a group of plan making rules includes data related to operation plan making conditions registered in the frame, that is, data indicating that the kind of operation plan is a load follow-up plan, that the current power is 65% or less, and that the power is in the process of rising. Therefore, the conclusion section "CR search" of the rule_f_3 is registered in the unit queue.

③ Since an event "CR search" has been registered in the unit queue, and according to a metarule having "CR search" in its "if" section, a decision is next made to apply a group of CR search rules.

④ The rule_cr_1 of a group of CR search has in its "if" section a memo of CR search [off] registered in the private memo of the view note (a flag indicating that the calculation of CR search has not been started). Therefore, the "then" section of the rule_cr_1 is executed. A method of "CR search" of the frame "plan" is started. This method calls research (i) which is a program in C language, calculates the control rod pattern and the core flow rate at time i, and stores the calculation result in a slot celled the current CR in the frame. In this manner, the control rod pattern and the core flow rate with respect to the power pattern specified at Step 10 are decided, and a draft operation plan of the reactor is prepared. This operation plan is evaluated as it goes through the core characteristics prediction at Step 13 and the decision at Step 14, and if this decision is "YES", the operation plan becomes an official one. The above-mentioned program is a core one-point-approximated simulator.

(iv) An example of operation plan prepared

An example of operation plan prepared by the operation plan unit 4 is an operation plan used to restart the BWR plant after the plant was stopped owing to lightning, for example. An example of CRT display screen by this operation plan is shown below.

Figure 12:
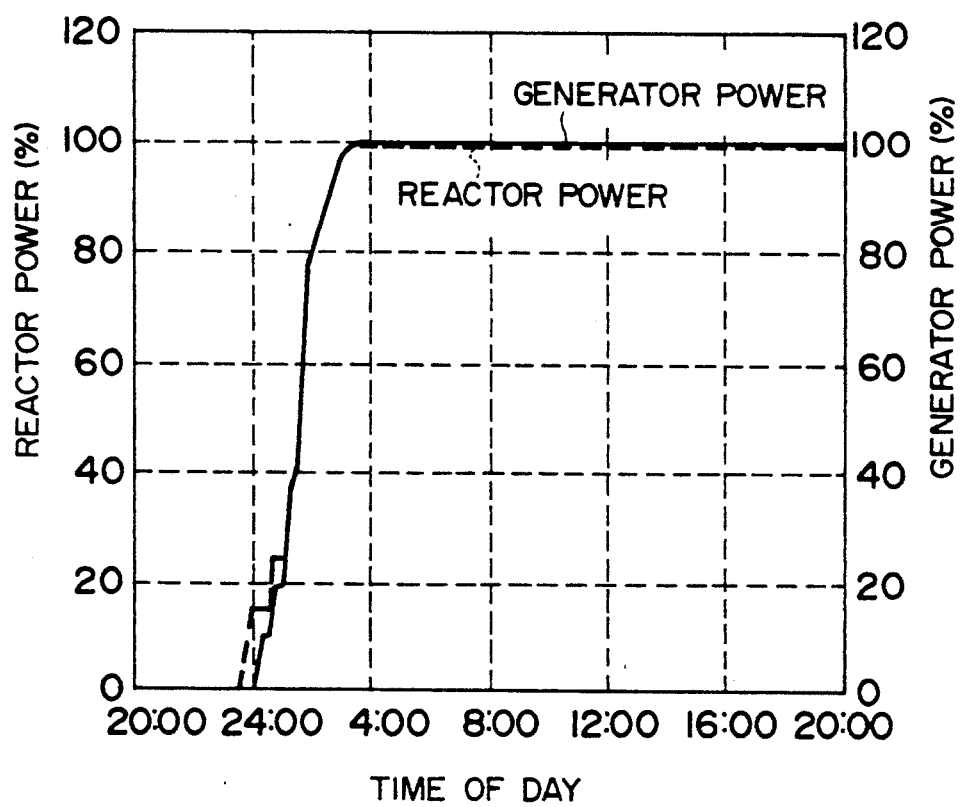
FIG. 12 is a diagram for explaining an operation plan of power change pattern, which is prepared by the operation plan unit.

The power change pattern shows changes with time of the generator power and the reactor power. FIG. 12 shows an example of displayed power change pattern. In this example, a restart operation is started at time 20:00. The reactor is made to reach its critical level in about one hour, and the temperature and the pressure of the reactor are raised to the rated values in about one hour. Then, the reactor power is increased to the rated value in about six hours.

Figure 13:
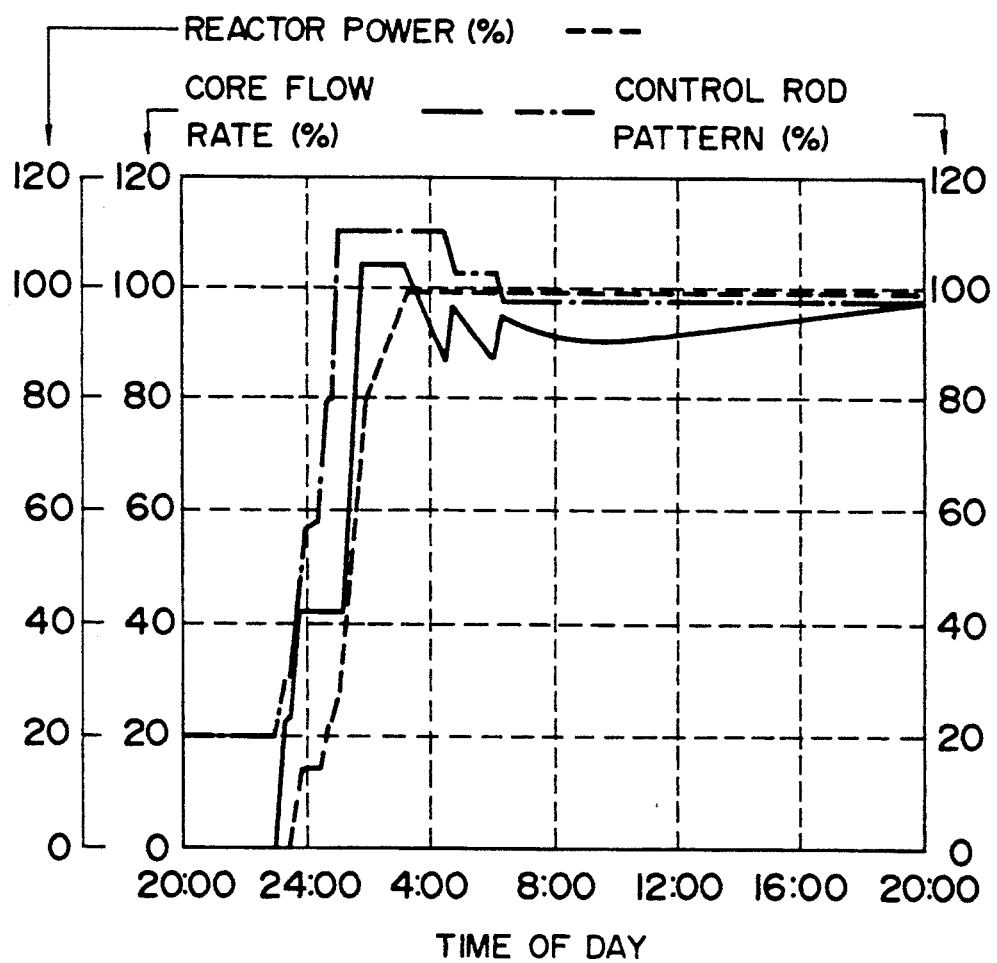
FIG. 13 is a diagram for explaining changes with time of the core flow rate and the control rod pattern in relation to the operation plan of FIG. 12.

FIG. 13 shows changes with time of the core flow rate and the control rod pattern to achieve the operation plan mentioned above. In FIG. 13, the values of the control rod pattern correspond to the reactor power when the core flow rate is at the rated value and the xenon concentration is in equilibrium, and comply with the value x in the so-called x% control rod pattern. The increase in the control rod pattern is caused by lifting the control rod pattern, while the decrease in the control rod pattern is caused by lowering the control rods. In this operation plan, the core flow rate shows decreases at times 4:00 and 7:00 and is likely to violate the limit condition. Therefore, with the reactor power maintained at a fixed level, the control rods are inserted (to decrease the values of the control rod pattern) and the core flow rate is increased. In other words, the core flow rate adjustment and the control rod operation are scheduled to be used at the same time.

As shown in FIG. 14, the operation plan table includes the items of an operation plan such as the generator power, reactor power, control rod pattern, and the core flow rate, and also the core thermal characteristics at this time, such as MFLCPR and MFLPD. By looking at the CRT screen, the user can accurately grasp the changes in the quantities of state of the reactor.

FIG. 15 shows an example of operation route showing the relation between the reactor power and the core flow rate. This diagram indicates that it is possible to abide by the limit condition without letting the relation between the power and the flow rate enter the operation-prohibited region.

Figure 16:
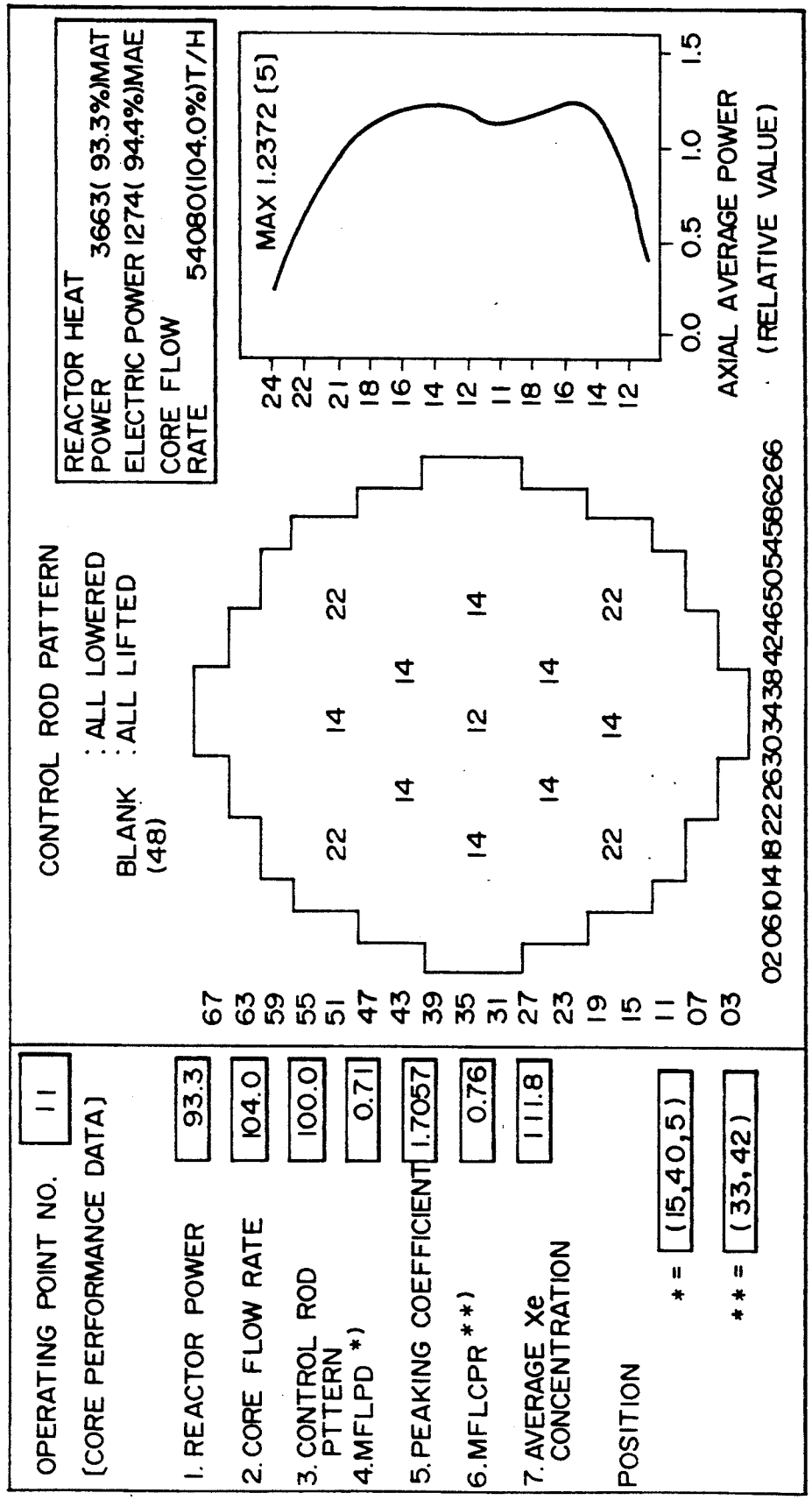
FIG. 16 is a diagram for explaining results of three-dimensional simulation of core characteristics according to the operation plan of FIG. 12.

FIG. 16 shows an example of analysis result of the core characteristics according to this operation plan by using a three-dimensional simulator. This example shows the control rod lifting positions and the axial average power distribution, by which you can decide whether or not an operation which satisfies the limit condition is possible and see if there is any problem in the power distribution.

An operation plan under normal condition which has been made by the operation plan unit 4 and for which no problem with the core characteristics has been confirmed by the three-dimensional simulator is input by the BWR plant operator into the supervisory monitor and control unit 2. This input may be done automatically. The result of simulation by the three-dimensional simulator is shown on the display unit 17.

(2) Supervisory monitor and control unit

Figure 17:
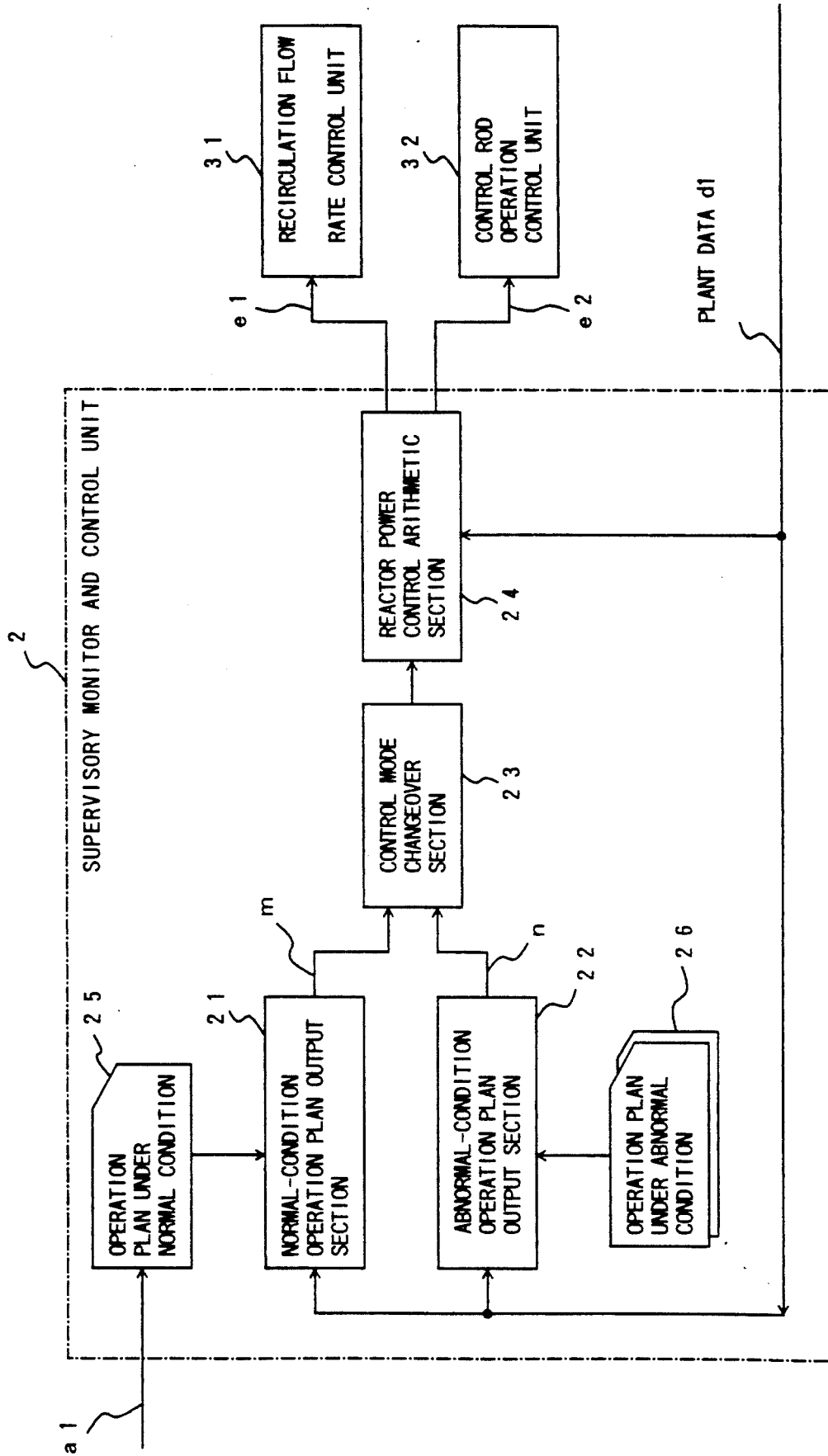
FIG. 17 is a block diagram of a supervisory monitor and control unit of FIG. 3.

FIG. 17 shows the composition of the supervisory monitor and control unit 2 and its relation with control units 31 and 32.

An operation plan a1 prepared by the operation plan unit 4 is stored in the storage means 25 of the supervisory monitor and control unit 2. In order to achieve a reactor operation according to the operation plan a1, a normal-condition operation plan output section 21 outputs a control command m (a reactor power target value (or a generator power target value) and commands for power control by core flow rate adjustment, power control by control rod operation or power control by both) corresponding to the current plant condition to a reactor power control arithmetic section 24 through a control mode changeover section 23 when the plant condition is within the normal operation range and is normal. To make the reactor power (or the generator power) measured at the plant 1 coincide with a reactor power target value included in the control command m, the reactor power control arithmetic section 24 calculates and outputs a target value e1 of the recirculation pump speed and a command e2 for control rod operation (commands for lifting/lowering/operation interruption, etc.).

Figure 18:
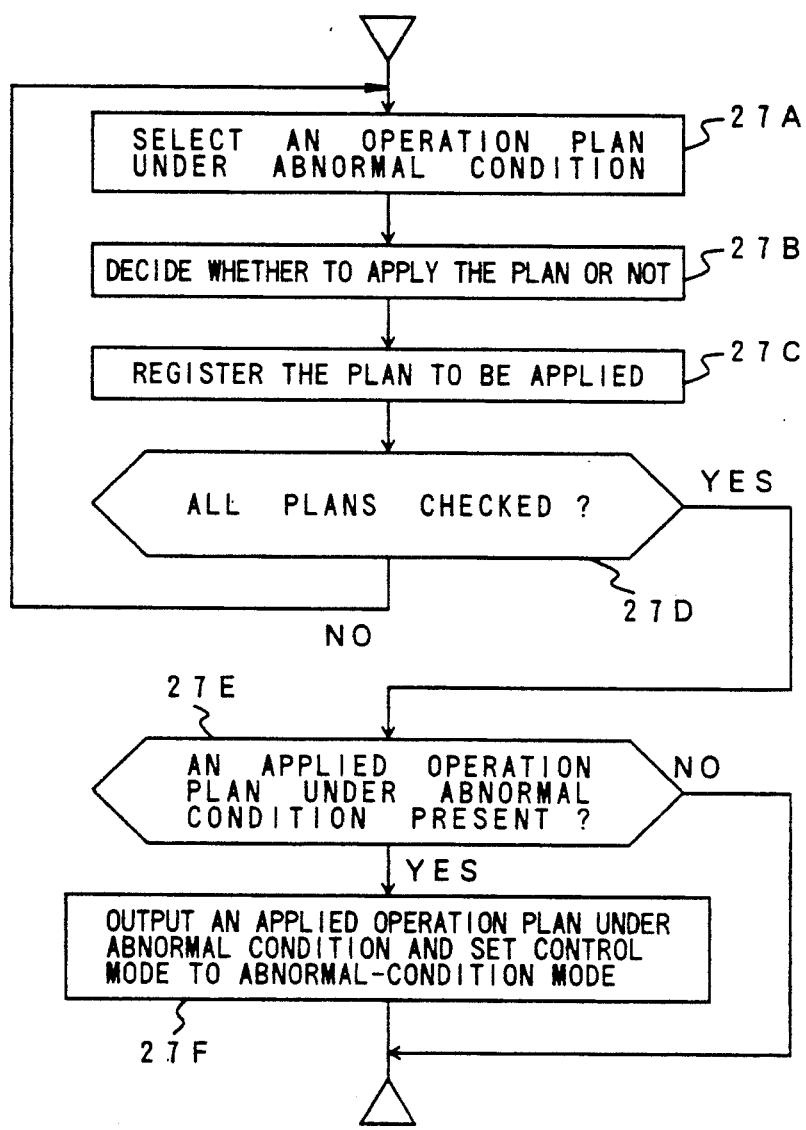
FIG. 18 is a diagram for explaining the procedure of the abnormal-condition operation plan output section.
Figure 23A:
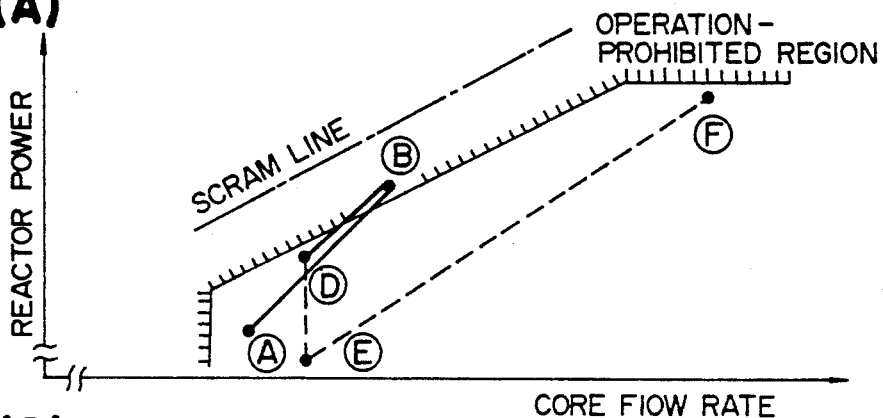
FIGS. 23 (A) to 23 (D) and FIGS. 24 (A) to 24 (C) are characteristic diagrams showing the conditions of BWR plant operation executed in the embodiment of FIG. 3.
Figure 23B:
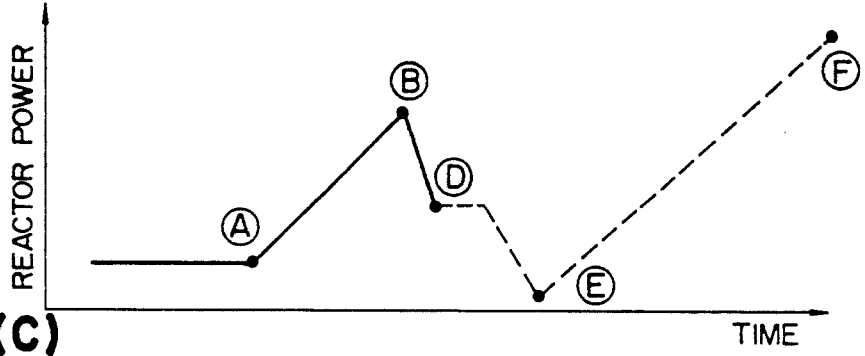
Figure 23C:
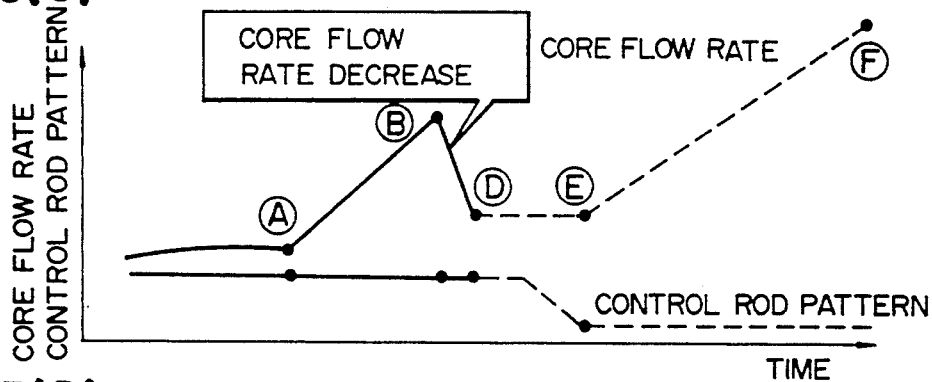
Figure 23D:
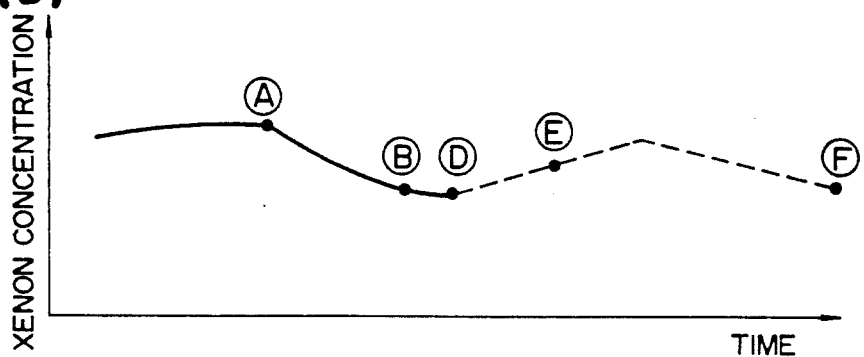

The supervisory monitor and control unit 2 has a plurality of operation plans under abnormal condition, which will be described later, stored in storage means 26. The abnormal-condition operation plan output section 22 decides whether or not to apply an operation plan under abnormal condition by receiving plant data d1. The abnormal-condition operation plan output section 22 executes the procedure (Steps 27A to 27F) of FIG. 18, that is, selects an operation plan under abnormal condition (Step 27A) and decides whether or not to apply this plan (whether the plant condition deviates from the normal operation range) (Step 27B). When a decision is made that the operation plan under abnormal condition should be applied (i.e., the plant condition deviates from the normal operation range), the operation plan under abnormal condition is registered independently (Step 27C). At Step 27E, a decision is made whether or not an operation plan under abnormal condition, registered at Step 27C, is present. If there exists an operation plan under abnormal condition to be applied, the decision at Step 27E is "YES", the control mode changeover section 23 is switched to the abnormal-condition operation mode, and an operation plan under abnormal condition to be applied is output to the reactor power control arithmetic section 24 (Step 27E). By making a decision of whether or not to apply an operation plan under abnormal condition with a period of one second for example, when the plant condition deviates from the normal operation range, an automatic action for this condition can be taken instantly.

A concrete example of an operation plan under abnormal condition will be described.

FIGS. 19 to 21 show examples of operation plans under abnormal condition. Those operation plans are stored classified into groups of different operation modes, such as those in operation mode of reactor power of about 10% or more and those in reactor start operation mode with a reactor power of less than 10%. This obviates the need to make decisions of whether or not to apply operation plans under abnormal condition, which do not match the current plant condition in the least, so that time for decision can be reduced.

An operation plan of No. 1 in FIG. 19 is for an automatic action to be taken when the operating point related to the reactor power and the reactor flow rate comes into the operation-prohibited range (i.e., the operation range is not abided by). As shown in FIG. 22, this operation plan is to interrupt the increase in reactor power when the operating point reaches the rod block line, decrease the core flow rate to reduce the reactor power by 10% when the rod block line is exceeded by more than predetermined value, and to insert the control rods to reduce the reactor power by another 10% when the operating point comes very close to the reactor scan line.

An operation plan under abnormal condition of No. 2 in FIG. 19 is for an automatic action to be taken when the operating point related to the reactor power and the core flow rate comes into the unstable range, and inserts the control rods to reduce the reactor power to 25%.

An operation plan of No. 3 in FIG. 19 is for an automatic action to be taken when a reactor feed water pump trips. This operation plan reduces the reactor power to at least 75% when the reactor power is 50% or more, one of the two turbine-driven feed water pumps trips, and a stand-by feed water pump starts to run, and reduces the reactor power to 50% when the stand-by feed water pump does not start.

An operation plan under abnormal condition of No. 4 in FIG. 20 is for an automatic action to be taken when the core thermal characteristics are abnormal. No. 5 in FIG. 20 is an operation plan under abnormal condition for an automatic action to be taken when the power system frequency rises abnormally. No. 6 of FIG. 21 is an operation plan under abnormal condition for an automatic action to be taken when the value of the start region neutron monitor shows an abnormal rise. No. 7 of FIG. 21 is for an automatic action to be taken when the reactor temperature rise rate goes up abnormally. NO. 8 of FIG. 21 is an operation plan under abnormal condition for an abnormal increase of the value of the output region neutron monitor which occurs when the reactor is being started. Among those operation plans under abnormal condition are plans to automatically reduce reactor power by a predetermined range (e.g., 10%) to a predetermined level (e.g., 80%)

(3) Operation of the automation system

Description will be made of the operation of the automation system according to this embodiment when an operation plan under abnormal condition described above is applied.

FIG. 23 shows an example of analysis result of the operation which is carried out when the operating point related to the reactor power and the core flow rate deviates from the normal operation range. This example corresponds to the prior art of FIG. 1. Let us suppose that in FIG. 23, when the reactor power was rising from the condition (A) to the condition (B) according to a normal operation plan a1, the operating point deviated from the normal operation range (block line) and the operating point went into the operation-prohibited region for some reason. The supervisory monitor and control unit 2 executes the process of FIG. 18. More specifically, the abnormal-condition operation plan output section 22 decides whether or not to apply an operation plan under abnormal condition, and if the plan output section 22 finds it necessary, the control mode changeover section 23 switches the mode to the abnormal-condition operation mode. In an example of an operation under abnormal condition (as shown in FIG. 23), the reactor power control arithmetic section 24 automatically interrupts the rise of the reactor power (to be more precise, interrupts the increase in the core flow rate and the lifting of the control rods) according to the operation plan under abnormal condition of No. 1 in FIG. 19. If the deviation from the normal operation range becomes large and the operating point comes closer to the scram line, the reactor power is automatically decreased 10% by reducing the core flow rate. In other words, the plant condition automatically shifts from the condition (B) to the condition (D) within the normal operation range. When the plant condition becomes the condition (D), the plant condition is not deviating from the normal operation range. Therefore, the abnormal-condition operation plan output section 22 switches the control mode changeover section 23 to the normal operation mode. Since an operation plan under normal condition which causes a change from the condition (D) to the condition (F) is not stored in the storage means 25, the condition (D) is maintained. Then, the operation plan unit 4, as described above, makes a new operation plan a1 to move the plant condition from the condition (D) after the operation plan under abnormal condition was executed, pass through the condition (E) and reaches the condition (F). In compliance with this new operation plan, the reactor power control and arithmetic section 24 starts an operation to increase the reactor power to the condition (F). The operation plan unit 4 may be said to make a new operation plan (to go back to the previous operation) to return from the finished condition of the operation according to an operation plan under abnormal condition to a normal operating condition before the plant condition deviated from the normal operation range.

Figure 24A:
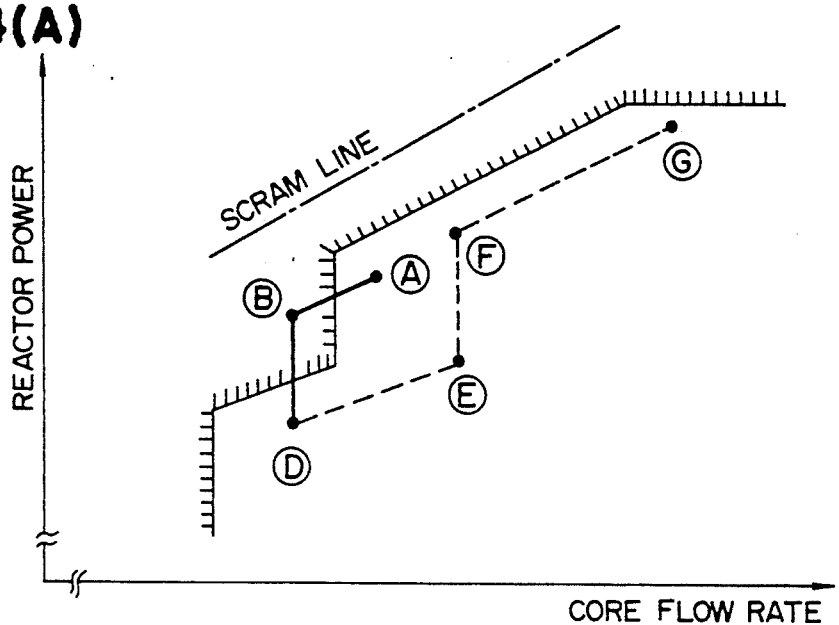
Figure 24B:
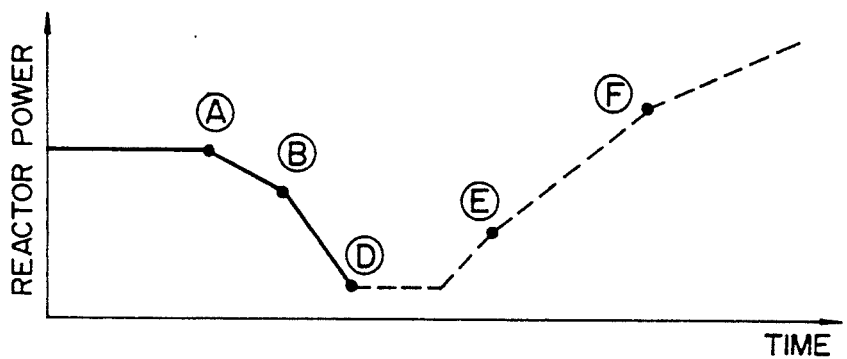
Figure 24C:
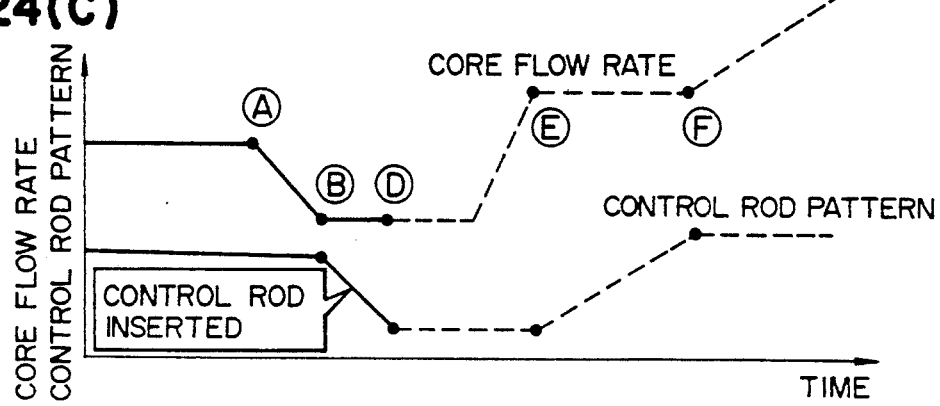

FIG. 24 shows the operation of an embodiment of this invention when the operating point of the BWR plant went into the unstable region. This example corresponds to the prior art of FIG. 2. In FIG. 24, if the plant condition moves from (A) to (B) for some reason, the BWR plant will be operated according to an operation plan under abnormal condition of No. 2 of FIG. 19. Specifically, the control rods are lowered, thereby automatically reducing the reactor power to 25%, so that the condition of the BWR plant moves to the condition (D) in the normal operation range. Thereafter, the operation plan unit 4 makes a new operation plan to move the plant condition from (D) to (E), (E) to (F), and (F) to (G). According to this new operation plan, the reactor power is raised from (D) to (G).

Figure 25:
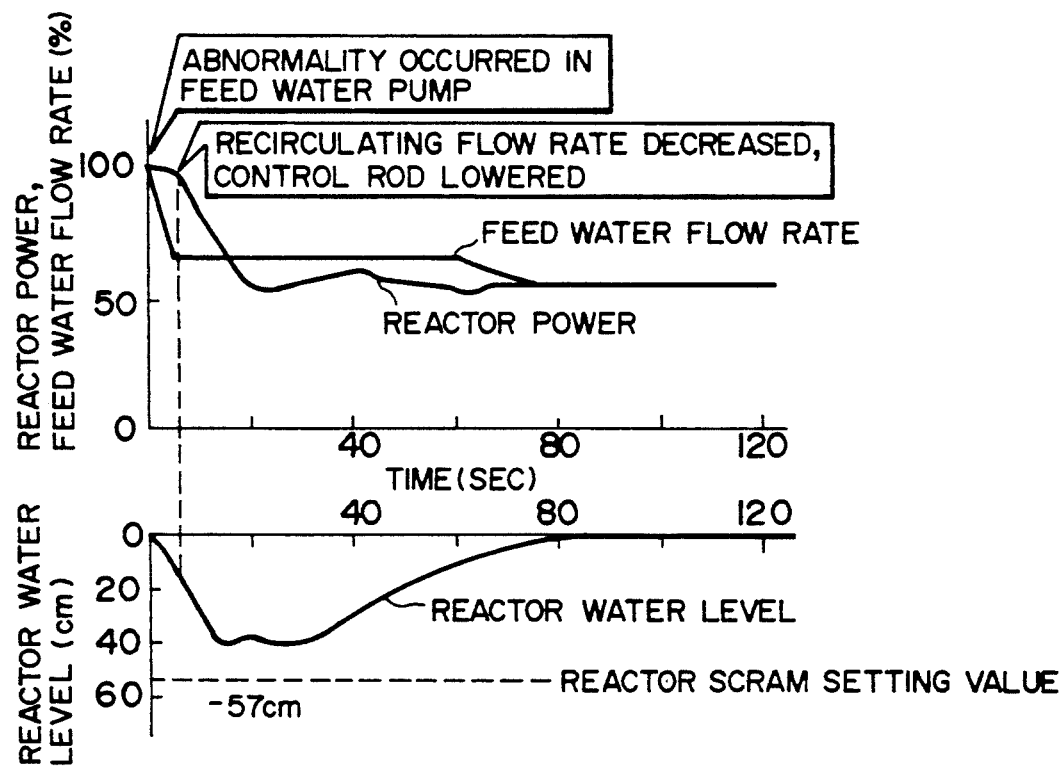

Suppose that while the BWR plant is operated at 100% of the reactor power, one of the two feed water pumps tripped, and an event of the stand-by feed water pump's failure to start occurred. In this case, the second operation plan under abnormal condition of No. 3 in FIG. 19 is applied and the plant condition changes as shown in FIG. 25. If abnormality mentioned above occurs in the feed water pump, the reactor water level lowers, but the recirculation pump speed (or the core flow rate) is reduced and the reactor is decreased to 50%, so that the flow rate of steam generated by the reactor can be decreased. As a result, the reactor water level does not go down to a set value of scram and therefore, a scram of the reactor can be avoided.

After automatic actions under abnormal condition mentioned above are finished, the feed water pump is investigated to find the cause of the abnormality and maintained. Then, the operation plan unit 4 makes a plan to bring the reactor power, for example, from about 50% to 100% of the rated value, at which the plant was operated previously. However, it is difficult to estimate time for the investigation and maintenance in advance. For this reason, it is difficult to make ready an accurate operation plan which conforms to the reactor power which changes with time. Therefore, it is necessary to make a plan for changing the reactor power by adjusting the core flow rate and controlling the control rods in accordance with the change in the xenon concentration of the reactor.

Figure 26:
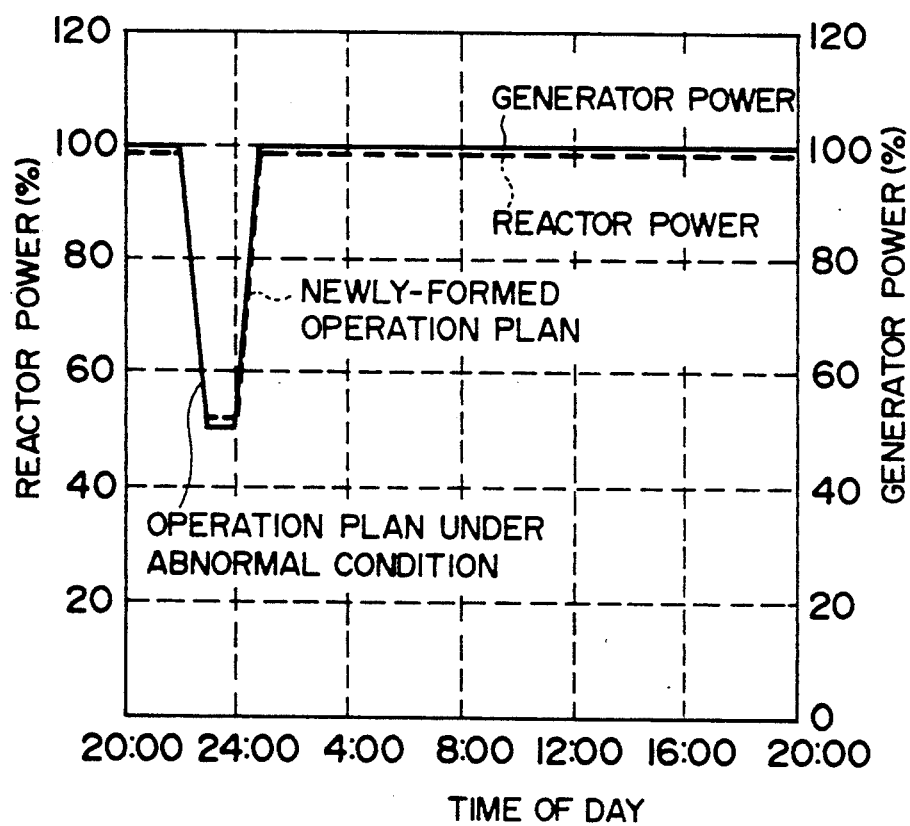
Figure 27:
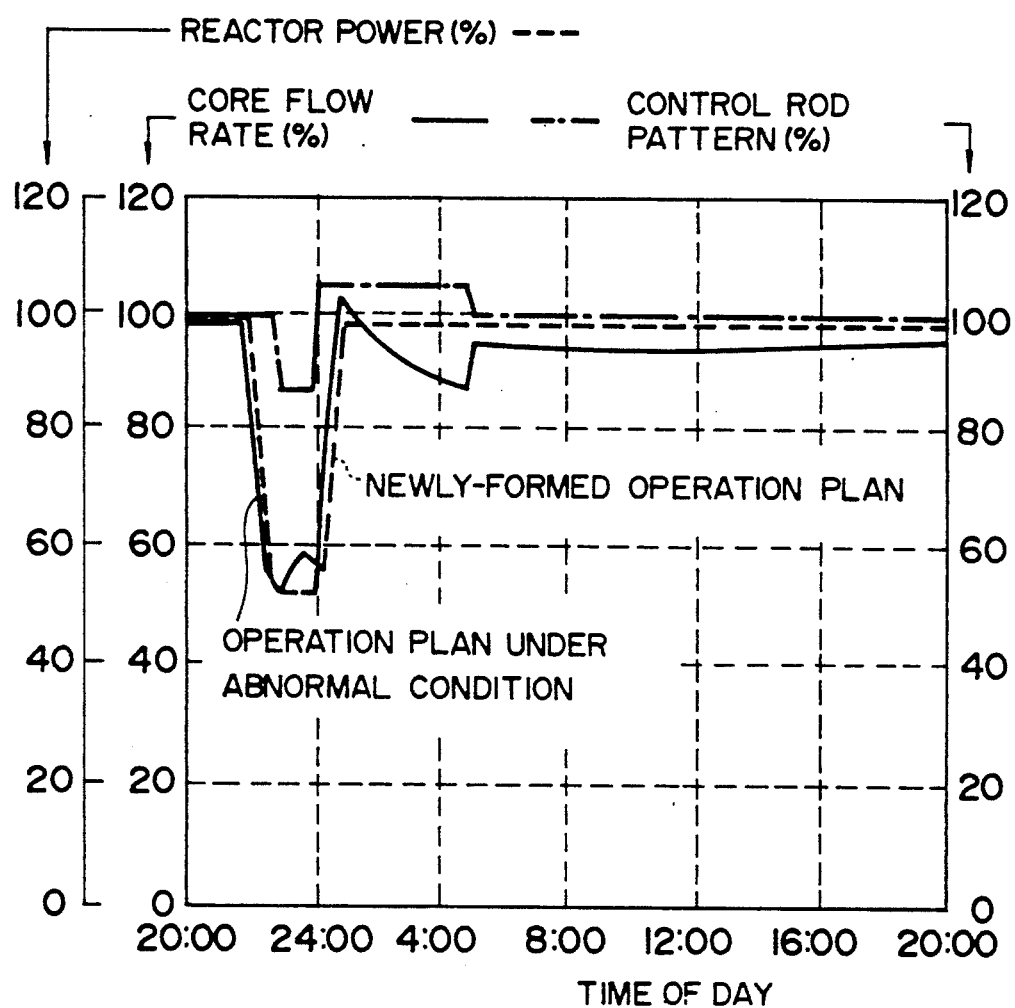

FIGS. 26 and 27 show examples of new operation plans, which are used after an operation under abnormal condition was performed. New operation plans are made by the operation plan unit 4. In those plans, the reactor power was scheduled to be maintained at 100% of the rated power, but the reactor power dropped to 50% as shown in FIG. 25. To rectify this power drop, an operation plan was made to start to increase the reactor power and the generator power from time 24:00 and raise to the rated power at time 1:00. As shown in FIG. 27, changes with time of the core flow rate almost equal to the recirculation flow rate and the control rod pattern are not necessarily simple. In those new operation plans, the plant is scheduled to be operated at time 5:00 by carrying out an operation of jointly using the core flow rate adjustment and the control rod operation while the reactor power is maintained constant and performing an operation of conducting the core flow rate adjustment and the control rod operation separately at time other than the above-mentioned time. In order to achieve an efficient operation abiding by the operation standard, it is necessary to make appropriate operation plans as described.

New operation plans a1 for normal condition, made by the operation plan unit 4 as described, are registered by the operator or the engineer in the storage means 25 of the supervisory monitor and control unit 2. And, the mode changeover section 23 switches the operation mode to the normal operation mode. Now, the BWR plant can be operated according to a new operation plan as shown in FIG. 26 or 27.

According to an embodiment of this invention described above, various kinds of abnormality of the BWR plant can be dealt with automatically to avoid a scram of the reactor, thereby improving the operating rate of the BWR plant. Another effect of this invention is as follows. It is possible to efficiently make an operation plan to return to the pre-existent operating condition after an automatic operation has been done according to an operation plan under abnormal condition, and carry out the return operation plan in a short time. Therefore, it is possible to improve the BWR plant operating rate and operation reliability, alleviate the burden on the operators and engineers, and reduce the labor requirement for operation.

In this embodiment, knowledge engineering methods are used in making and revising operation plans. Therefore, yet another effect is that adequate operation plans can be made and revised efficiently which are based on specialized knowledge about the formulation of operation plans. The values of the xenon concentration, core flow rate, control rod pattern, etc. are determined quantitatively by using both knowledge (rules) and a simplified core simulator. Therefore, the number of items of knowledge required is far smaller than the case where the values are determined quantitatively only by knowledge.

In this embodiment, operation plans under abnormal condition, which are decided by the supervisory monitor and control unit 2 whether they are adopted or not, are limited in number according to the reactor conditions (to be more precise, operation modes). Therefore, this invention provides a still further effect that decision can be made in a short time.

According to this embodiment, in addition to an operation of separately changing the core flow rate and the control rod positions, an operation of simultaneously changing these items (i.e., the core flow rate adjustment and the control rod operation are performed jointly) is performed. By this jointly-controlled operation, it is possible to carry out an operation of maintaining the reactor power at a constant level while abiding by the limit condition of the core flow rate. Therefore, the reactor power need not be reduced unnecessarily, so that this contributes to an improvement of the operating rate of the BWR plant.

If the thermal characteristics of the core become abnormal by disobeying the operation standard, the reactor power is reduced automatically to bring the plant condition to a condition satisfying the operation standard. Consequently, the condition of disobeying the operation standard does not last for a long time, so that the plant can be operated safely.

In an embodiment of this invention mentioned above, description centered on the start operation of the BWR plant, this invention can be applied to other operations, such as a stop operation, load follow-up operation, rated power operation, and control rod pattern adjusting operation.

Figure 31:
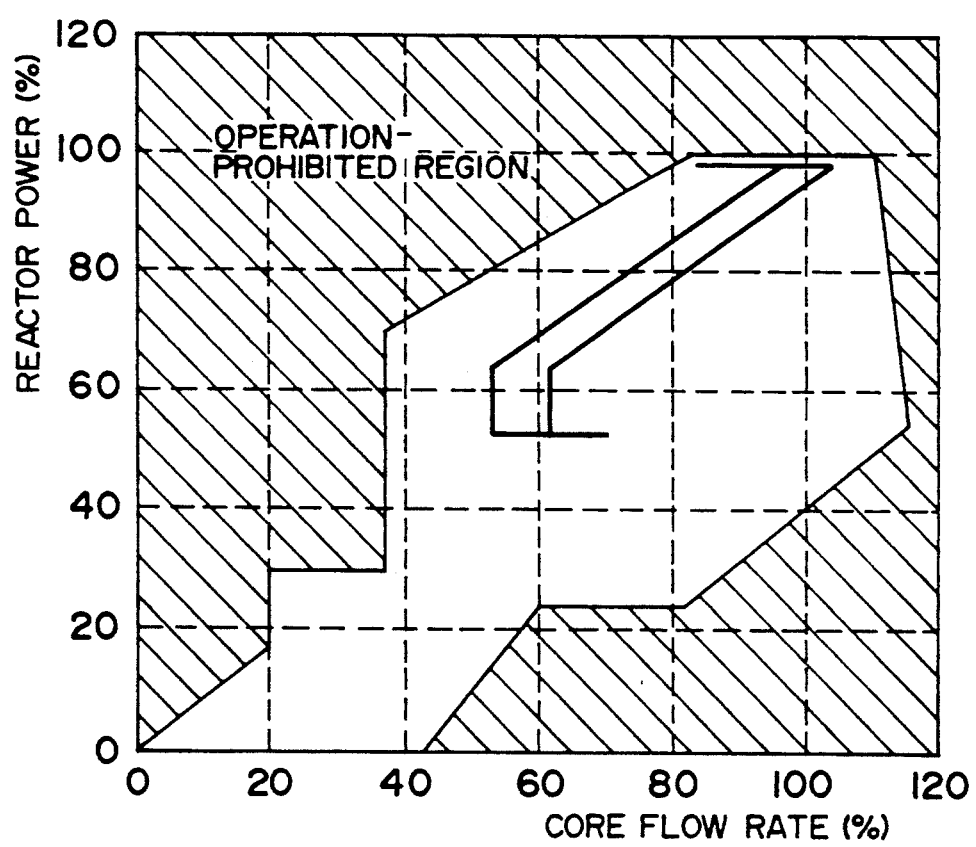

An embodiment of this invention which is applied to a load follow-up operation will now be described. FIGS. 28 and 31 show examples of load follow-up operation plans.

FIG. 28 shows a power change pattern in a load follow-up operation, prepared by the operation plan unit 4. In this example, the generator power is reduced to 50% during the night from time 23:00 to 7:00, the power then is scheduled to be brought back to 100% of the rated value.

Figure 29:
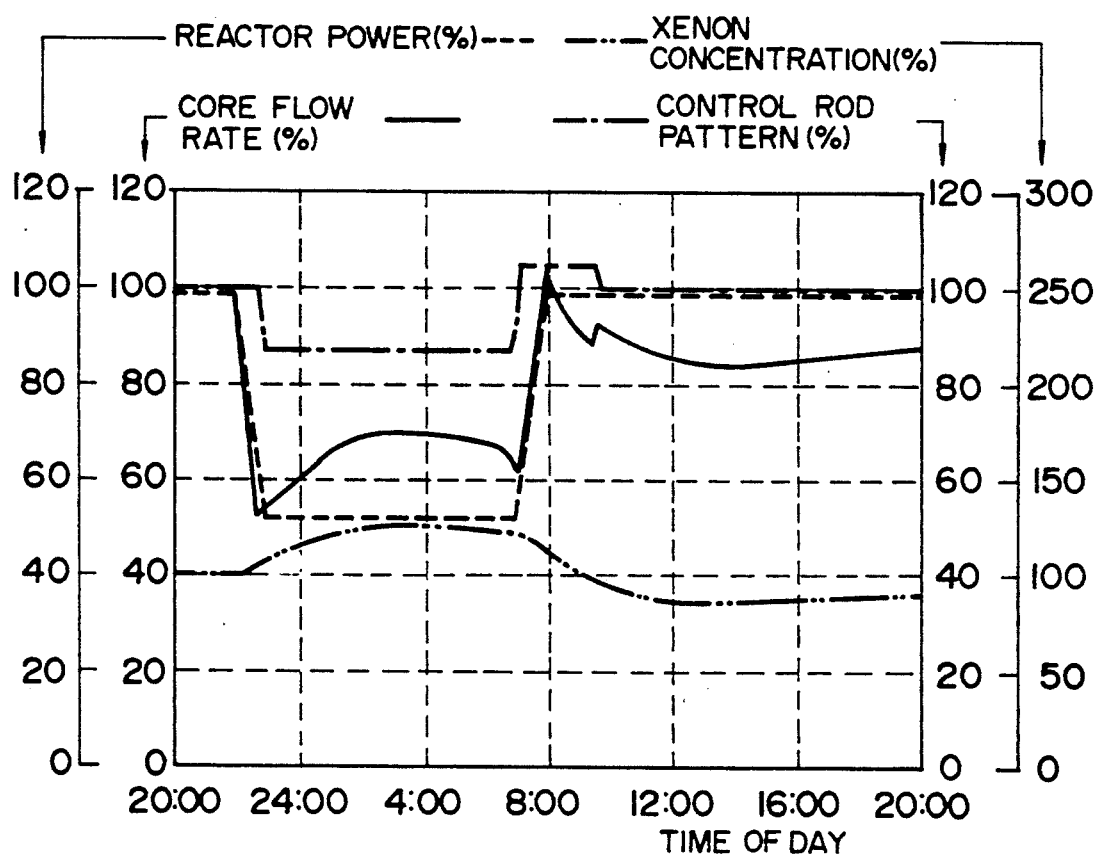

FIG. 29 indicates an operation plan for changes with time of the core flow rate and the control rod pattern to achieve the above-mentioned power change pattern. In this operation plan, the core flow rate is adjusted according to changes in the reactor power and the xenon concentration. However, the reactor power cannot probably be controlled only by adjustment of the core flow rate (i.e., the limit condition for the core flow rate is disobeyed. So, the control rods are also operated. The decrease in the values of the control rod pattern corresponds to lowering of the control rods, while the increase in the values of the control rod pattern corresponds to lifting of the control rods. In this embodiment, the operation plan is arranged such that the plant is operated to maintain the reactor power at about 50% while the control rods are lifted and the core flow rate is decreased simultaneously at about time 7:00 and on the other hand, the plant is operated to maintain the reactor power at about 100% by lowering the control rods and increasing the core flow rate simultaneously at about time 10:00.

FIG. 30 shows the power, core flow rate, control rod pattern, and the thermal characteristics of the core at specified times. The limit condition for MFLCPR and MFLPD, which are the thermal characteristics of the core is to maintain the value at 1.0 or less. This operation plan has enough allowances with regard to the limit condition.

FIG. 31 shows the operation route in relation to the reactor power and the core flow rate, and indicates that the plant can be operated by complying with the operation standard without allowing the relation between the reactor power and the core flow rate to go into the operation-prohibited region.

Normal operation plans made by the operation plan unit 4 as described are input by the operator or engineer of the BWR plant into the supervisory monitor and control unit 2. A load follow-up operation is almost the same as the reactor output operation mode in an start operation of the BWR plant described earlier. Therefore, an operation plan under abnormal condition is substantially the same as an operation plan under abnormal condition in the reactor power operation mode in FIGS. 19 and 20. Therefore, the operation of the supervisory monitor and control unit 2, the control units 31, 32, and the operation plan unit 4, which takes place when the plant condition deviates from the normal operation range in a load follow-up operation is substantially the same as in the plant start operation mode described above. The effects of this embodiment are the same as the effects of embodiments intended for the plant start operation described above.

In the foregoing embodiments, description has been made of the cases in which there are provided a plurality of control units, such as a recirculation flow rate control unit, control rod control unit, feed water flow rate control unit, and turbine control unit. Those control units may be realized by a single control unit. In this case, the same effects can be obtained as in the embodiment of FIG. 3.

The function of the supervisory monitor and control unit 2 may be realized by those control units. Also in this embodiment, the same effects can be obtained as in the embodiment of FIG. 3.

As another embodiment of this invention, it is possible to apply this invention to a pressurized water reactor (PWR). In this embodiment, a control rod operation control unit is used in place of the recirculation flow rate control unit in a BWR plant, and a boron concentration control unit is used in place of the control rod operation control unit in a BWR plant. Still, by this embodiment, it is possible to automatically deal with various kinds of abnormality in the plant and thereby improve the operating rate of the plant. Furthermore, according to this embodiment, an operation plan to return to the previous operation is made after an operation plan under abnormal condition has been executed, and this return operation can be started in a short time, so that it is possible to improve the plant operating rate, lessen the burden on the operator and the engineer, and achieve labor savings in operation. Those effects are the same as in a BWR plant.

In the foregoing embodiments, normal operation plans are made after the plant condition has become abnormal, but time for making and revising operation plans need not be limited to such a timing. In other words, the engineer at the site of the plant may, when necessary, prepare and revise normal operation plans on receipt of a command from the central load-dispatching office or according to monitor results of the plant condition.

According to this invention, when the condition of a nuclear power generation plan deviates from the normal operation range, the reactor power can be reduced automatically by a predetermined value or to a predetermined level, thus preventing a scram of the plant. Therefore, the plant operating rate can be improved. On the other hand, an operation plan to return to the previous operating condition can be prepared efficiently and this return operation can be started in a short time. Therefore, the plant operating rate can be improved, the burden on the operator and the engineer can be lessened, and labor for operation can be reduced.

When the core thermal characteristics or the like deviate from the normal operation range, the reactor power is decreased automatically, allowing the plant condition to move into to a condition satisfying the operation standard. Hence, the condition disobeying the operation standard does not last long, so that the plant can be operated safely.

What is claimed is:

1. An automation system for nuclear power plants, comprising:

operation plan making means for, after a nuclear power plant has been operated according to an operation plan under abnormal condition, making an operation plan to return to the normal operating condition, which had existed before the plant condition deviated from the normal operation range, from a condition that the operation according to the operation plan under abnormal condition has been finished;

means for storing said operation plan under abnormal condition to decrease the reactor power to a level of power within said normal operation range when the operating condition of said nuclear power plant deviates from said normal operation range;

means for deciding from detected plant data whether or not to perform an operation according to said operation plan under abnormal condition;

control and arithmetic means for outputting control commands according to the operation plan;

means for transmitting said operation plan under abnormal condition to said control and arithmetic means when said decision means makes a decision to perform an operation according to said operation plan under abnormal condition;

supervisory control means having the control and arithmetic means for outputting control commands according to said new operation plan when said operation plan under abnormal condition has been executed; and control means for controlling controlled operation conditions of the plant according to said control commands.

2. An automation system for nuclear power plants according to claim 1, wherein said supervisory control means includes means for storing a normal operation plan, and wherein said means for transmitting said operation plan under abnormal condition is changeover means for transmitting one of said normal operation plan and said operation plan under abnormal condition to said control and arithmetic means.

3. An automation system for nuclear power plants according to claim 2, wherein said means for storing a normal operation plan stores a normal operation plan and said new operation plan which is applied after an operation plan under abnormal condition has been executed.

4. An automation system for nuclear power plants according to claim 1, wherein said operating plan making means includes a simulator for evaluating the adequacy of said new operation plan.

5. An automation system for nuclear power plants according to claim 1, wherein said operation plan making means comprises a knowledge base for storing knowledge necessary for making said new operation plan, and inference means for making said new operation plan by inference using said knowledge.

6. An automation system for nuclear power plants according to claim 5, wherein said operation plan making means includes a core one-point-approximated simulator, and wherein said inference means is means for executing inference by using calculated values obtained by said core one-point-approximated simulator.

7. An automation system for nuclear power plants according to claim 4, wherein said operation plan making means comprises a knowledge base for storing knowledge necessary for making said new operation plan, and inference means for making said new operation plan by inference using said knowledge.

8. An automation system for nuclear power plants according to claim 7, wherein said operation plan making means includes a core one-point-approximated simulator in addition to said simulator, and wherein said inference means is means for executing inference by using calculated values obtained by said core one-point-approximated simulator.

* * * * *